United States Patent
Wu et al.

(10) Patent No.: US 11,917,144 B2
(45) Date of Patent: Feb. 27, 2024

(54) EFFICIENT IN-LOOP FILTERING FOR VIDEO CODING

(71) Applicant: MediaTek Inc., Hsinchu (TW)

(72) Inventors: Yueh-Lin Wu, Hsinchu (TW); Min-Hao Chiu, Hsinchu (TW); Yen-Chieh Huang, Hsinchu (TW)

(73) Assignee: MediaTek Inc. (TW)

( * ) Notice: Subject to any disclaimer, the term of this patent is extended or adjusted under 35 U.S.C. 154(b) by 0 days.

(21) Appl. No.: 17/844,034

(22) Filed: Jun. 19, 2022

(65) Prior Publication Data

US 2023/0412800 A1    Dec. 21, 2023

Related U.S. Application Data

(60) Provisional application No. 63/249,633, filed on Sep. 29, 2021.

(51) Int. Cl.
| | |
|---|---|
| *H04N 19/159* | (2014.01) |
| *H04N 19/82* | (2014.01) |
| *H04N 19/117* | (2014.01) |
| *H04N 19/176* | (2014.01) |

(52) U.S. Cl.
CPC ......... *H04N 19/117* (2014.11); *H04N 19/159* (2014.11); *H04N 19/176* (2014.11); *H04N 19/82* (2014.11)

(58) Field of Classification Search
CPC ............................ H04N 19/117; H04N 19/159
See application file for complete search history.

(56) References Cited

U.S. PATENT DOCUMENTS

| | | | | |
|---|---|---|---|---|
| 10,003,798 | B2 * | 6/2018 | Hsu ...................... | H04N 19/117 |
| 11,363,265 | B2 * | 6/2022 | Ahn ..................... | H04N 19/176 |
| 2006/0165181 | A1 * | 7/2006 | Kwan .................. | H04N 19/176 |
| | | | | 375/E7.176 |
| 2006/0262862 | A1 * | 11/2006 | Cheng .................... | H04N 19/86 |
| | | | | 375/E7.19 |
| 2016/0191951 | A1 * | 6/2016 | Van der Auwera .. | H04N 19/593 |
| | | | | 375/240.12 |

(Continued)

FOREIGN PATENT DOCUMENTS

| | | |
|---|---|---|
| TW | 201828708 A | 8/2018 |
| TW | 201813381 A | 4/2021 |

OTHER PUBLICATIONS

Taiwan Intellctual Property Office, Office Action in Taiwan Patent Application No. 111136540, dated Aug. 7, 2023.

*Primary Examiner* — Irfan Habib
(74) *Attorney, Agent, or Firm* — Han IP PLLC; Andy M. Han

(57) ABSTRACT

Various schemes for realizing efficient in-loop filtering are described, manifested in low latency and reduced hardware cost for an in-loop filter comprising at least two filtering stages. An apparatus receives pixel data of a current block of a picture and one or more neighboring blocks thereof, based on which the apparatus performs a filtering operation and generates a filtered block that includes completely filtered sub-blocks and partially filtered sub-blocks. The apparatus further outputs an output block that includes the completely filtered sub-blocks as well as a respective portion of each of the partially filtered sub-blocks, wherein the respective portion is adjacent to one of the completely filtered sub-blocks.

17 Claims, 18 Drawing Sheets

(56) References Cited

U.S. PATENT DOCUMENTS

| | | | |
|---|---|---|---|
| 2018/0184125 A1* | 6/2018 | Nandan | H04N 19/80 |
| 2022/0070499 A1* | 3/2022 | Nandan | H04N 19/86 |
| 2023/0113001 A1* | 4/2023 | Kanoh | H04N 19/176 |
| | | | 375/240.02 |

* cited by examiner

EFFICIENT IN-LOOP FILTERING FOR VIDEO CODING

CROSS REFERENCE TO RELATED PATENT APPLICATION(S)

The present disclosure claims the priority benefit of U.S. Patent Application No. 63/249,633, filed 29 Sep. 2021, the content of which being herein incorporated by reference in its entirety.

TECHNICAL FIELD

The present disclosure is generally related to video coding and, more particularly, to methods and apparatus for enhancing operation efficiency of in-loop filtering within a video encoder or decoder.

BACKGROUND

Unless otherwise indicated herein, approaches described in this section are not prior art to the claims listed below and are not admitted as prior art by inclusion in this section.

Video coding generally involves encoding a video (i.e., an original video) into a bitstream by an encoder, transmitting the bitstream to a decoder, and decoding the video from the bitstream by the decoder parsing and processing the bitstream to produce a reconstructed video. The encoder may employ various coding modes or tools in encoding the video, with a purpose, among others, of reducing a total size of the bitstream that needs to be transmitted to the decoder while still providing the decoder enough information about the original video such that a reconstructed video that is satisfactorily faithful to the original video can be generated by the decoder. However, the various coding tools, while achieving their respective coding purposes, may invariably introduce visual artifacts during the encoding and decoding processes. Specifically, many of the coding tools are block-based coding tools, which means a picture or a frame to be coded is divided into many non-overlapping rectangular regions called "blocks". The blocks constitute the basic elements processed by the coding tools, as often seen in intra-picture prediction and inter-picture prediction, the two main techniques used in video coding. Since the blocks are coded relatively independently from each other, when the coded blocks are put together to reconstruct the picture, visual artifacts may present, e.g., at the edges of the blocks.

An in-loop filter may be applied to a reconstructed picture to treat or otherwise mitigate the visual artifacts mentioned above, thereby improving the subjective quality of the reconstructed picture. An in-loop filter often includes several individual filters that mitigate different visual artifacts respectively. For example, one filter may be employed to smooth the block edges, while another filter is employed to reduce a ringing artifacts or changes in sample intensity of some areas of the picture. The individual filters may operate simultaneously in a pipeline fashion, each filter being a stage of a pipeline. That is, a first filter of the in-loop filter may process a first block of the reconstructed picture, and then pass the result to the next stage, i.e., a second filter of the in-loop filter. While the second filter operates on the result (e.g., pixel data) passed from the first filter, the first filter may process a second block of the reconstructed picture, and so on. The pipeline is referred to as an in-loop filter because it is applied in both the encoding loop of a video encoder and the decoding loop of a video decoder. Specifically, the in-loop filter is applied after the inverse quantization (IQ) but before storing the picture to the decoded picture buffer (DPB). On the decoder side, the improved quality of the reconstructed pictures provides more ideal reference pictures to the decoding process, which translates into a higher compression efficiency.

Since the in-loop filter is employed in both the encoding loop and the decoding loop, it constitutes an important part of the video coder. Accordingly, the efficiency of the in-loop filter has a significant impact on the overall coding efficiency, such as latency and throughput. Various techniques demonstrated in the present disclosure may be employed to enhance the efficiency of an in-loop filter, thereby enhancing the efficiency of the video encoder or decoder that employs the efficient in-loop filter.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to in-loop filtering or post processing of video picture frames after a picture is reconstructed using block-based intra-picture or inter-picture prediction but before being stored in a decoded picture buffer (DPB). It is believed that with the various embodiments in the present disclosure, benefits including improved coding latency, higher coding throughput, and/or reduced hardware overhead are achieved.

In one aspect, a method is presented for performing a filtering operation to a current block of a picture, whereas picture may be a reconstructed picture of a video encoder or video decoder using block-based intra-picture or inter-picture prediction. The method may involve receiving pixel data of the current block, as well as pixel data of one or more neighboring blocks of the current block. In some embodiments, the one or more neighboring blocks may include a neighboring block immediately above the current block and a neighboring block immediately left to the current block. The method may also involve generating a filtered block by performing the filtering operation to the current block. The filtering operation may be performed using the pixel data of the current block and the pixel data of the one or more neighboring blocks. The filtered block may include one or more completely filtered sub-blocks and one or more partially filtered sub-blocks. Finally, the method may also involve outputting an output block. The output block may include the one or more completely filtered sub-block and a respective portion of each of the one or more partially filtered sub-blocks, wherein the respective portion is either edge-adjacent or corner-adjacent to a corresponding one of the completely filtered sub-blocks. The respective portions of the partially filtered sub-blocks may collectively form an L-shaped area having a first segment and a second segment. In some embodiments, each of the first and second segments of the L-shaped area may have a width that is relevant to a filtering setting used in the filtering operation. For example, according to the filtering setting, the filtering operation may involve referencing a first number of pixels and revising a second number of pixels. The width of the L-shaped area may be equal to a difference between the first number and the second number. In some embodiments, the filtering operation (e.g., a deblocking operation) may be performed by a first filter, and the output block may be sent to a second filter for an additive filtering operation (e.g., a de-ringing operation). The first and second filters are configured to process the blocks of the picture in a block-based pipeline fashion.

In another aspect, an apparatus is presented which comprises an input module, a neighboring block buffer, a deblocking filter, a filtered block buffer, and an output module. The input module is configured to receive a current block of a picture. The neighboring block buffer is configured to store a first set of pixel data of one or more neighboring blocks of the current block. The deblocking filter is configured to perform a deblocking operation to the current block, and the deblocking operation may be performed using pixel data of the current block and the first set of pixel data of the one or more neighboring blocks. The filtered block buffer is configured to store one or more completely filtered sub-blocks and one or more partially filtered sub-blocks. Moreover, the output module is configured to output an output block based on the deblocking operation performed by the deblocking block. In particular, the output block may include the one or more completely filtered sub-blocks and a respective portion of each of the one or more partially filtered sub-blocks. In addition, each of the respective portions may be adjacent (e.g., edge-adjacent or corner-adjacent) to a corresponding one of the completely filtered sub-blocks. In some embodiments, the respective portions of the partially filtered sub-blocks collectively form an L-shaped area. The L-shaped area may be formed by two rectangular segments, each of which has a respective width. The widths of the segments may be determined by one or more filtering settings used with the deblocking operation. For example, the deblocking operation may involve referencing a first number of pixels and revising a second number of pixels, and widths of the segments of the L-shaped area may be equal to a difference between the first number and the second number. In some embodiments, the neighboring block buffer is further configured to store a second set of pixel data of the one or more neighboring blocks, and the apparatus further comprises a de-ringing filter, which is configured to perform a de-ringing operation to the one or more completely filtered sub-blocks using pixel data of the output block and the second set of pixel data of the one or more neighboring blocks. The de-ringing operation may be performed with a specific filtering setting, too. For instance, the de-ringing operation may involve referencing a specific number of pixels adjacent to each pixel of the output block in each of a left direction, a right direction, a top direction, and a bottom direction. The de-ringing operation may then involve revising the respective pixel of the output block based on the referencing. In some embodiments, the widths of the segments of the L-shaped area may be equal to the specific number of pixels. In some embodiments, the specific number is also equal to the difference between the first number and the second number of the filtering setting used by the deblocking filter. In an event that the filtering setting of the deblocking filter is different from the filtering setting of the de-ringing filter, i.e., the specific number is different from the difference between the first number and the second number, the widths of the sections of the L-shaped area may be determined to be the lower value among the specific number (as used in the de-ringing operation) and the difference between the first number and the second number (as used in the deblocking operation).

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art.

In the description below, details of well-known features and techniques may be omitted to avoid unnecessarily obscuring the presented embodiments and implementations.

Implementations in accordance with the present disclosure relate to various techniques, methods, schemes and/or solutions pertaining to realizing efficient in-loop filtering for a video encoder or decoder. According to the present disclosure, a number of possible solutions may be implemented separately or jointly. That is, although these possible solutions may be described below separately, two or more of these possible solutions may be implemented in one combination or another.

1. Block-Based In-Loop Filtering

Figure 1:
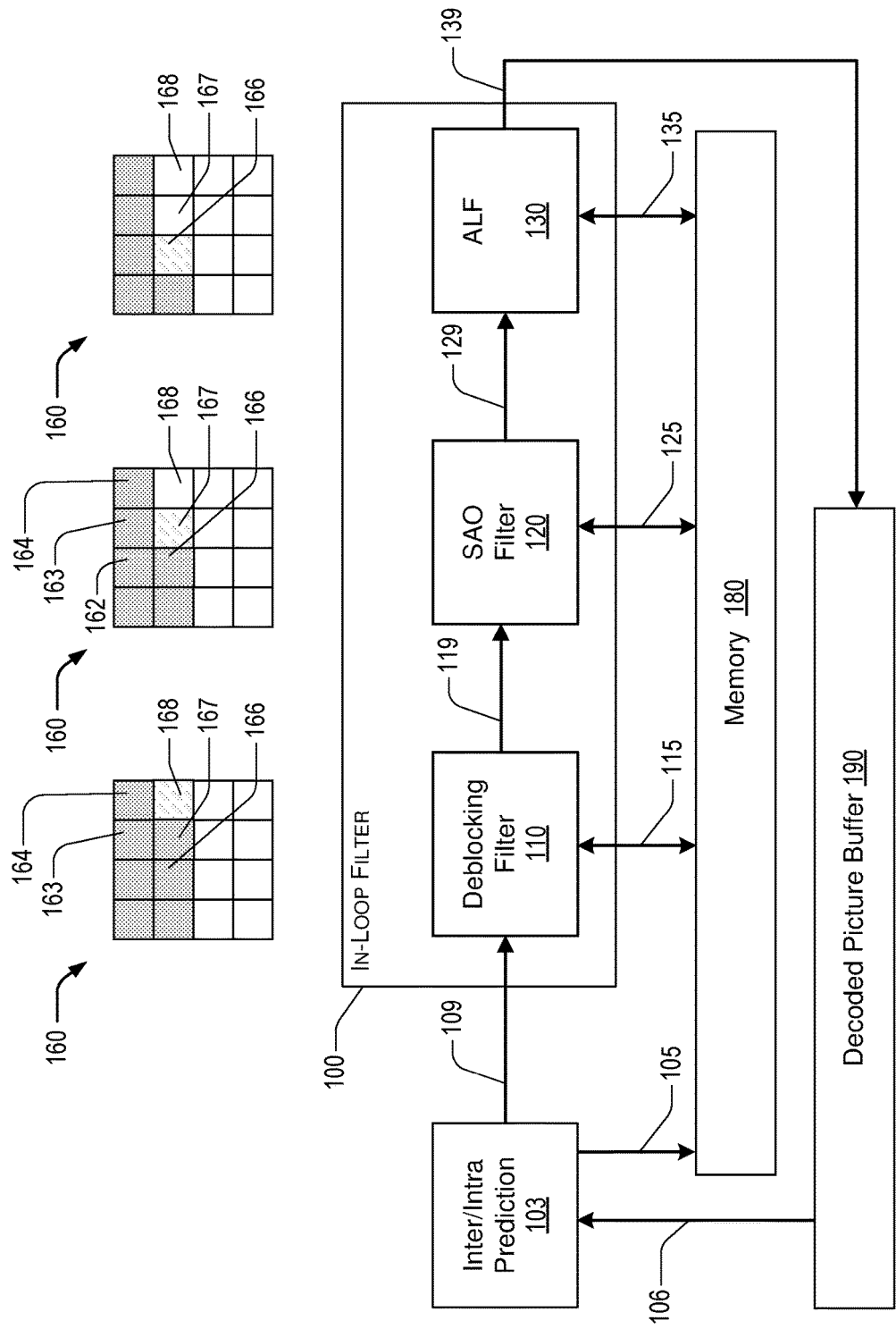
FIG. 1 is a diagram of an example design in accordance with an implementation of the present disclosure.

An in-loop filter is an essential part of a video encoder or decoder. FIG. 1 is a diagram of an example design in accordance with an implementation of the present disclosure, wherein an in-loop filter 100 is shown along with its relationship with some other blocks of the video encoder or decoder. As described elsewhere herein above, an in-loop filter may include several filtering stages, each configured to perform a respective filtering operation, that operate together as a block-based filtering pipeline for processing reconstructed pictures generated by intra-picture or inter-picture predictions to enhance subjective picture quality thereof. As shown in FIG. 1, the in-loop filter 100 includes a deblocking filter 110 as a first stage of the pipeline, a sample adaptive offset (SAO) filter 120 as a second stage of the pipeline, and an adaptive loop filter (ALF) 130 as a third stage of the pipeline. The in-loop filter 100 may process a picture or a frame 160 that is generated by an inter- or intra-picture prediction module 103. The inter/intra prediction module 103 may reconstruct the picture 160 from raw data (e.g., of a video picture) using various intra-picture prediction techniques and inter-picture prediction techniques to remove spatial and temporal redundancy in the raw data, respectively. The picture 160 is thus often referred to as a "reconstructed picture". The inter/intra prediction module 103 may process the raw data in a block-based fashion. Namely, each frame may be divided into multiple blocks, i.e., rectangular, non-overlapping areas, and the inter/intra prediction module 103 may process the frame by processing the blocks sequentially.

The reconstructed picture 160 may be transmitted from the inter/intra prediction module 103 to the in-loop filter 100 via a data bus 109. Specifically, the data bus 109 may be employed to transmit the reconstructed picture 160 to the first stage of the in-loop filter 100, i.e., the deblocking filter 110. Similar to the inter/intra prediction module 103, the in-loop filter 100 may also process the reconstructed picture 160 in a block-based fashion. Nevertheless, the block division used by the in-loop filter 100 may be same or different from the block division used by the inter/intra prediction module 103. For example, the non-overlapping blocks that the in-loop filter 100 processes may be of a different size from the non-overlapping blocks that the inter/intra prediction module 103 processes. As shown in FIG. 1, the reconstructed picture 160 is divided into sixteen blocks of a same size, including a block 166, a block 167 adjacent to the block 166, and a block 168 adjacent to the block 167. The filtering pipeline of the in-loop filter 100 processes the reconstructed picture 160 such that three adjacent blocks are simultaneously processed by the three stages of the in-loop filter 100, respectively, whereas each of the three stages processes the three adjacent blocks sequentially in three consecutive pipeline cycles. For example, during a specific pipeline cycle, the deblocking filter 110 may be processing the block 166. During the next pipeline cycle (i.e., the cycle immediately following the specific pipeline cycle), the processing result of the block 166 may be passed from the deblocking filter 110 to the SAO filter 120 via a data bus 119 for the SAO filter 120 to process, while the deblocking filter 110 processes the following block, i.e., the block 167. During the following pipeline cycle (i.e., two cycles after the specific pipeline cycle), the processing result of the block 166 may be passed from the SAO filter 120 to the ALF 130 via a data bus 129 for the ALF 130 to process, and the processing result of the block 167 may be passed from the deblocking filter 110 to the SAO filter 120 via the data bus 119 for the SAO filter 120 to process, while the deblocking filter 110 processes the next block, i.e., the block 168. That is, during this pipeline cycle, the filters 110, 120 and 130 are processing the blocks 168, 167 and 166, respectively, as shown in FIG. 1. From a block's perspective, a block is progressing through the various stages of the in-loop filter 100 sequentially. For example, the block 166 is processed by the deblocking filter 110 in the specific pipeline cycle, and then by the SAO filter 120 in the next pipeline cycle, and then by the ALF 130 in the following pipeline cycle.

In the block-based pipeline process, each individual filter (i.e., each stage of the pipeline) may perform a respective filtering function using some of the pixel data of the current block (i.e., pixel data immediately passed from the previous stage), as well as some pixel data from one or more neighboring blocks that are adjacent to the current block. For example, when the SAO filter 120 processes the block 167, the SAO filter 120 may reference the pixel data of the block 167 that is received from the deblocking filter 110 via the data bus 119. Meanwhile, the SAO filter 120 may also reference pixel data of a few neighboring blocks that have been processed by the deblocking filter 110 in the pipeline processing, such as pixel data of blocks 162, 163, 164 and 166. Each of the blocks 162, 163, 164 and 166 is considered a neighboring block to the block 167 because it is adjacent (i.e., either edge-adjacent or corner-adjacent) to the block 167. In particular, the blocks 163 and 166 are edge-adjacent to the block 167 as each of them shares a respective block edge with the block 167. On the other hand, the blocks 162 and 164 are corner-adjacent to the block 167 as each of them has a block corner that is adjacent to a respective block corner of the block 167. Same is true for the deblocking filter 110 and the ALF 130. That is, each filtering stage of the in-loop filter 100 may reference pixel data of the immediate block that is passed from the preceding stage (i.e., the inter/intra prediction module 103 or the SAO filter 120), as well as certain pixel data of neighboring blocks that have been processed by the preceding stage in the past. The immediate block that a filtering stage is currently processing is interchangeably referred to as the "current block" for the filtering stage. The picture or frame that the current block belongs to, i.e., the picture 160, is referred to as "the current picture" or "the current frame".

For each of the filtering stages of the in-loop filter, pixel data of the immediate block is passed from the preceding filtering stage, except for the first stage (i.e., the deblocking filter 110), for which pixel data of the immediate block may be passed from the inter/intra prediction module 103. On the other hand, pixel data of neighboring blocks that is needed for processing the immediate block is to be fetched by individual filtering stages from memory 180, which stores pixel data of blocks as the blocks have been processed by individual filtering stages. For example, when the SAO filter 120 is processing the block 167, the pixel data of the block 167 is passed directly from the deblocking filter 110. However, the SAO filter 120 also needs to fetch from the memory 180 certain neighboring block pixel data needed for processing the block 167. The SAO may, for processing the immediate block 167, fetch certain pixel data of the neighboring blocks 162, 163, 164 and 166 from the memory 180 via data bus 125, whereas the pixel data of the blocks 162, 163, 164 and 166 has been stored in the memory 180 by the deblocking filter 110 via data bus 115 in previous pipeline cycles, i.e., when the deblocking filter 110 processed the blocks 162, 163, 164 and 166, respectively. Similarly, each of the deblocking filter 110 and the ALF 130 may receive pixel data of an immediate block from a preceding stage, i.e., the inter/intra prediction module 103 and the SAO filter 120, respectively. Meanwhile, each of the deblocking filter 110 and the ALF 130 may fetch pixel data of neighboring blocks of the respective immediate block from the memory 180, respectively via the data bus 115 and data bus 135. The neighboring block pixel data fetched by the deblocking filter 110 has been stored to the memory 180 by the inter/intra prediction module 103 via data bus 105 as a result of the inter/intra prediction module 103 processing the neighboring blocks previously. The neighboring block pixel data fetched by the ALF 130 has been stored to the memory 180 by the SAO filter 120 via the data bus 125 as a result of the SAO filter 120 processing the neighboring blocks previously.

A block, after passing through the various stages of the in-loop filter 100, is stored in a decoded picture buffer (DPB) 190 via data bus 139. The inter/intra prediction module 103 may access the DPB 190 via data bus 106 to fetch filtered pictures stored therein for performing subsequent inter- and intra-picture prediction operations. The pictures stored in the DPB 190, as they have been filtered by the in-loop filter 100 to remove certain picture artifacts, would then serve as more ideal candidates of reference pictures for the inter/intra prediction module 103, thereby increasing the resulted coding efficiency and hence the subjective quality of the resulted video.

Not all the data buses of FIG. 1 are equal in terms of data transferring efficiency or speed. For example, the data buses 119 and 129 are used for directly passing or otherwise transferring block data (i.e., pixel data of an immediate block) from a filtering stage to the next stage in the filtering pipeline of the in-loop filter 100, and thus have a high transfer speed. That is, transferring block data from one stage to the next within the in-loop filter 100 causes little latency. On the other hand, much more latency resides in each of the data buses 115, 125 and 135. This is because the data buses 115, 125 and 135 are connected to the memory 180, which is physically realized typically using a relatively low-speed memory, such as dynamic random-access memory (DRAM). Moreover, each of the data buses 115, 125 and 135 is used to fetch pixel data of more than one neighboring block instead of just one block, whereas accessing data from multiple blocks requires a longer access time. Namely, data access latency through the data buses 115, 125 and 135 is much larger than that of the data buses 119 and 129. In other words, the latency cost from accessing pixel data from the memory 180 is much higher than that from passing pixel data directly between the filtering stages of the in-loop filter 100. It follows that a data access scheme demanding less pixel data from the memory 180 is preferred in view of processing latency.

VIII. Deblocking Filter

Figure 2:
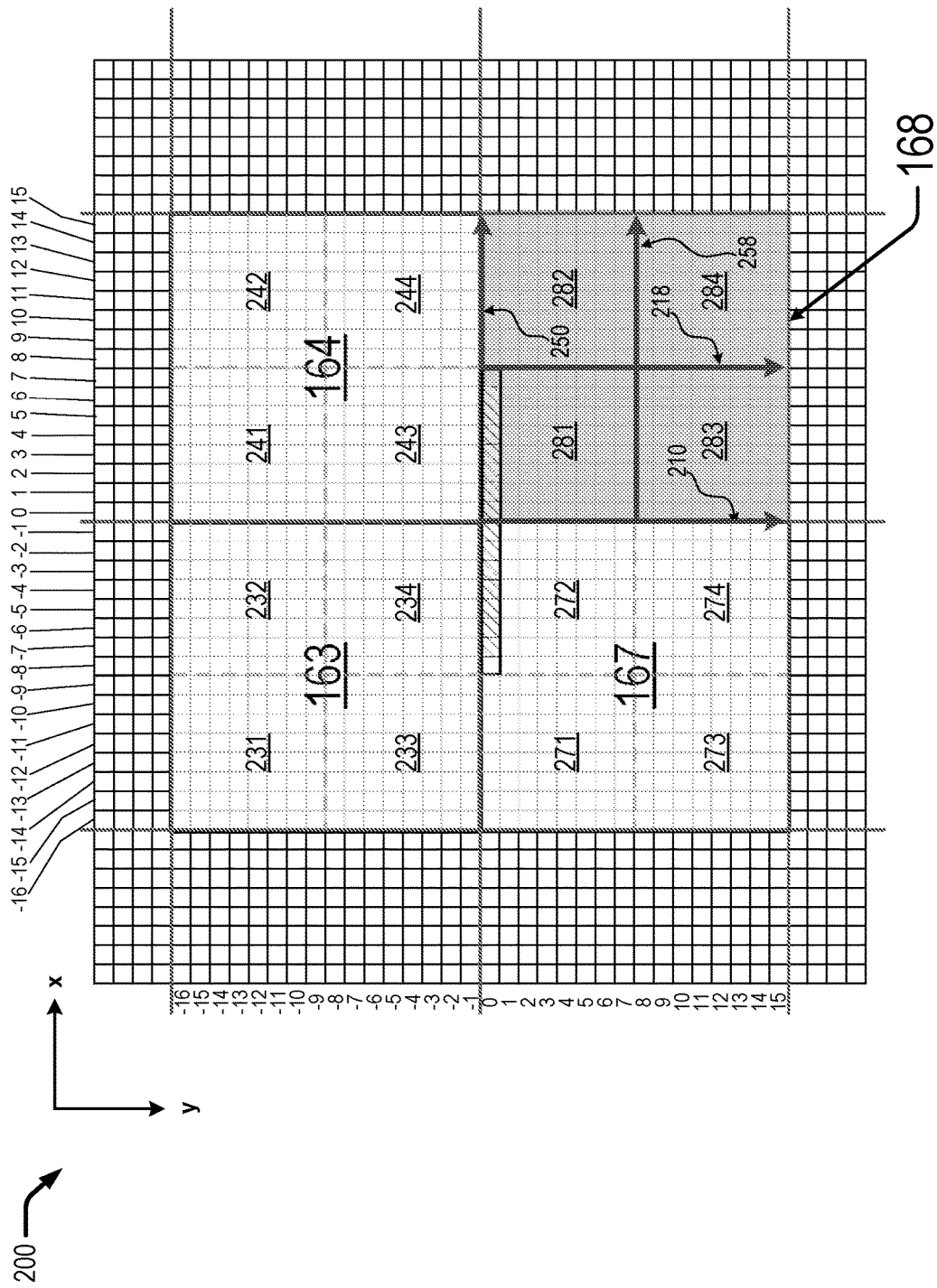
FIG. 2 is a diagram of an example design in accordance with an implementation of the present disclosure.

FIG. 2 is a diagram of an example design in accordance with an implementation of the present disclosure, wherein a deblocking filtering scheme 200 is illustrated. A block that is currently being processed by a filtering stage is referred to as "the immediate block" or "the current block" of that filtering stage. The deblocking filter 110 may perform a deblocking operation using the deblocking filtering scheme 200 to process the immediate block 168. As shown in FIG. 2, each of the blocks 163, 164, 167 and 168 is a 16-pixel-by-16-pixel block, namely, a rectangular region having sixteen pixels in width (i.e., in the x-direction) and sixteen pixels in height (i.e., in the y-direction). Each pixel of the blocks 163, 164, 167 and 168 is represented in FIG. 2 by a small square, which is identified with a unique (x, y) coordinate. For example, the first pixel of the block 163, i.e., the pixel at the top-left corner of the block 163, has a coordinate of (−16, −16), whereas the last pixel of the block 163, i.e., the pixel at the bottom-right corner of the block 163, has a coordinate of (−1, −1). Similarly, the current block that the deblocking filter 110 is currently processing, i.e., the block 168, has a total number of 256 pixels, starting with the (0,0) pixel and ending with the (15, 15) pixel. The block 164 also has 256 pixels, and the (x, y) coordinates of the pixels at the four corners of the block 164 are (0, −16), (15, −16), (0, −1) and (15, −1), respectively. The block 167 also has 256 pixels, and the (x, y) coordinates of the pixels at the four corners of the block 167 are (−16, 0), (−1, 0), (−16, 15) and (−1, 15), respectively.

In the present disclosure, a notation {(x, y) coordinates of the top-left corner pixel, (x, y) coordinates of the bottom-right corner pixel} is used to refer to a rectangular area encompassing multiple pixels. Following this notation, the block 167 of FIG. 2 may be referred to using {(−16, 0), (−1, 15)}, and the current block 168 may be referred to using {(0,0), (15,15)}. Similarly, the block 163 and 164 may be referred to as {(−16, −16), (−1, −1)} and {(0, −16), (15, −1)}, respectively. A column or a row of pixels may be referred to using the same notation. For example, the left-most column of the block 164 may be referred to as {(0, −16), (0, −1)}, whereas the bottom-most row of the block 163 may be referred to as {(−16, −1), (−1, −1)}.

To perform the deblocking operation for a current block, the deblocking filter 110 may process pixel data of the current block along one or more imaginary horizontal lines and/or one or more imaginary vertical lines of the current block. As shown in FIG. 2, the deblocking filter 110 may perform the deblocking operation to the current block 168 along two imaginary vertical lines 210 and 218, as well as two imaginary horizontal lines 250 and 258. The lines 210, 218, 250 and 258 are "imaginary" because they do not encompass any actual pixel of the block 168. Instead, each of the lines 210, 218, 250 and 258 is an imaginary boundary used to separate two groups of pixels. For example, the line 258 divides the block 168 into two sub-blocks, one of the two sub-blocks encompassing pixels having a y-coordinate of 7 or lower, the other of the two sub-blocks encompassing pixels having a y-coordinate of 8 or higher. Since the deblocking operation is performed along the lines 210, 218, 250 and 258, they are also referred to as "deblocking boundaries".

It is worth noting that some of the deblocking boundaries are also block boundaries, or edges, of the current block, whereas some of the deblocking boundaries are internal to the current block. For example, the deblocking boundaries 210 and 250 happen to be the left and top block boundaries (i.e., edges) of the block 168, whereas the deblocking boundaries 218 and 258 are located within the block 168, i.e., the internal deblocking boundaries. The internal deblocking boundaries 218 and 258 collectively divide the block 168 into four quadrants, each encompassing a sub-block 281, 282, 283 or 284. Each of the blocks 163, 164, 167 and 168 may be divided into a plurality of non-overlapping sub-blocks. As shown in FIG. 2, the block 168 is divided into the sub-blocks 281, 282, 283 and 284 by the deblocking boundaries 218 and 258. Likewise, the block 163 is divided into sub-blocks 231, 232, 233 and 234. The block 164 is divided into sub-blocks 241, 242, 243 and 244, whereas the block 167 is divided into sub-blocks 271, 272, 273 and 274.

The deblocking filter 110 performs the deblocking operation to a current block along a vertical deblocking boundary thereof (e.g., the boundary 210 or 218 of the block 168) such that each row of pixels crossing the vertical deblocking boundary is sequentially processed using a horizontal filtering operation. In addition, the deblocking operation is also performed along a horizontal deblocking boundary thereof (e.g., the boundary 250 or 258 of the block 168) such that each column of pixels crossing the horizontal deblocking boundary is sequentially processed using a vertical filtering operation. For example, the deblocking filter 110 may perform a horizontal filtering operation along the deblocking boundary 210 in a row-by-row fashion, starting from the row of y=0, and then the row of y=1, and then the row of y=2, and so on, and ending with processing the row of y=15.

Figure 3:
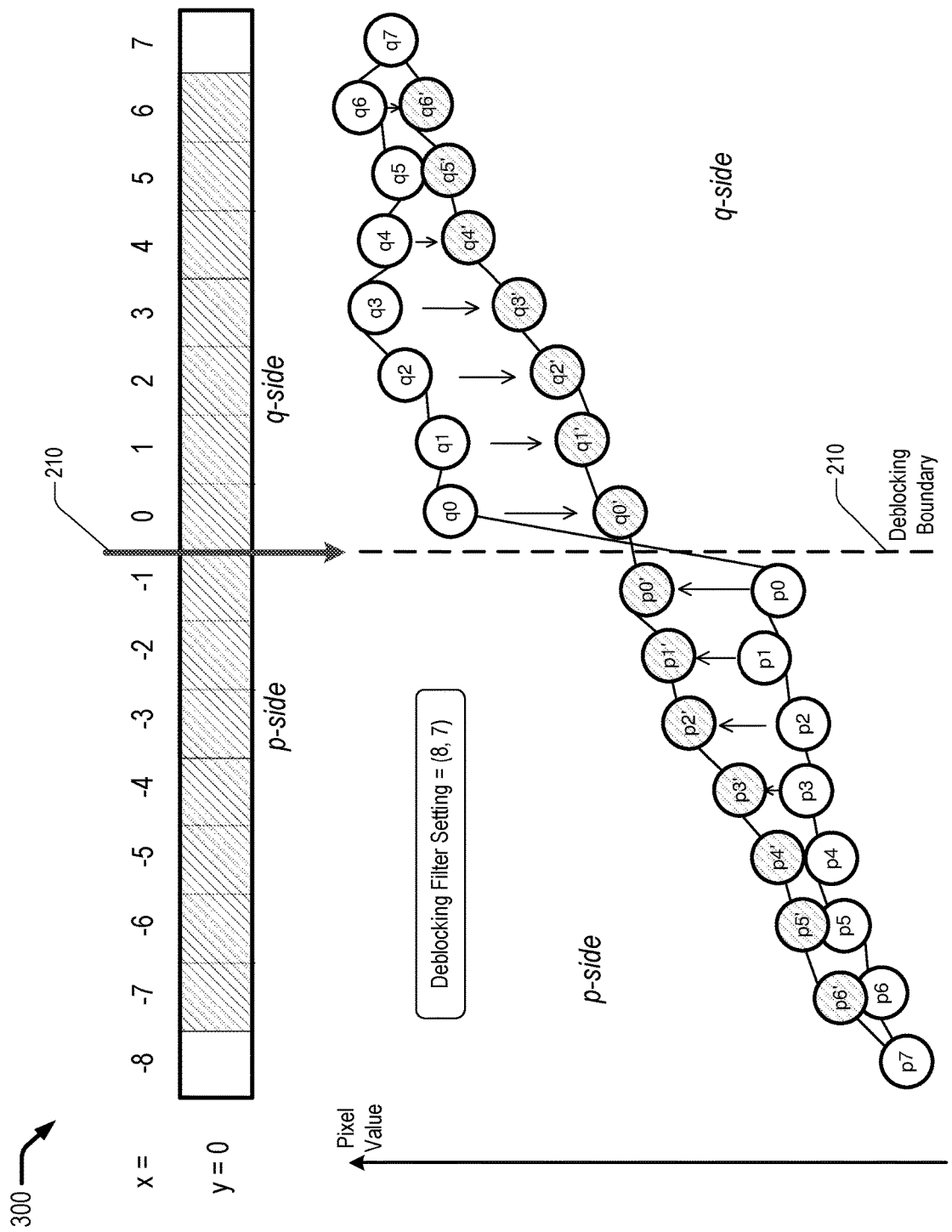
FIG. 3 is a diagram of an example design in accordance with an implementation of the present disclosure.

FIG. 3 is a diagram of an example design in accordance with an implementation of the present disclosure, wherein a horizontal filtering scheme 300 is illustrated for processing the row of y=0 as the deblocking filter 110 performs the deblocking operation along the deblocking boundary 210. As shown in FIG. 3, the horizontal filtering scheme 300 involves pixels on both sides of the deblocking boundary 210. In particular, the horizontal filtering scheme 300 involves referencing the first eight pixels on both sides of the deblocking boundary 210, and accordingly updating or revising the first seven pixels on both sides of the deblocking boundary 210. The two sides of a deblocking boundary may be referred to as the p-side and the q-side, as labeled in FIG. 3. According to the horizontal filtering scheme 300, the deblocking filter 110 may reference pixel data $\{(-8, 0), (-1,0)\}$ on the p-side and pixel data $\{(0, 0), (7,0)\}$ on the q-side. Based on the pixel data referenced, i.e., the row of pixels $\{(-8, 0), (7,0)\}$, the deblocking filter 110 may update or otherwise revise pixel value of each pixel of $\{(-7, 0), (6,0)\}$. Namely, in performing the horizontal filtering operation, the deblocking filter 110 may reference the first eight pixels on each of the p-side and the q-side and accordingly change the values of the seven pixels on each of the p-side and the q-side. In the present disclosure, the terms "update a pixel" and "revise a pixel" are interchangeably used to refer to the action of changing the pixel value of a pixel. As shown in FIG. 3, the first seven pixels on the p-side are revised from values p0, p1, p2, p3, p4, p5 and p6 to p0', p1', p2', p3', p4', p5' and p6', respectively, whereas the first seven pixels on the q-side are revised from values q0, q1, q2, q3, q4, q5 and q6 to q0', q1', q2', q3', q4', q5' and q6', respectively. The eighth pixel on each side, i.e., the pixel (−8, 0) and (7, 0), are referenced but not revised. The noticeable step at the deblocking boundary 210, which may be an artifact due to block-based prediction performed by the inter/intra prediction module 103, is now smoothed out by replacing the pixel values of {p6–p0, q0–q6} with {p6'–p0', q0'–q6'} after the horizontal filtering operation for the row {(−8, 0), (7, 0)} is performed.

Figure 4:
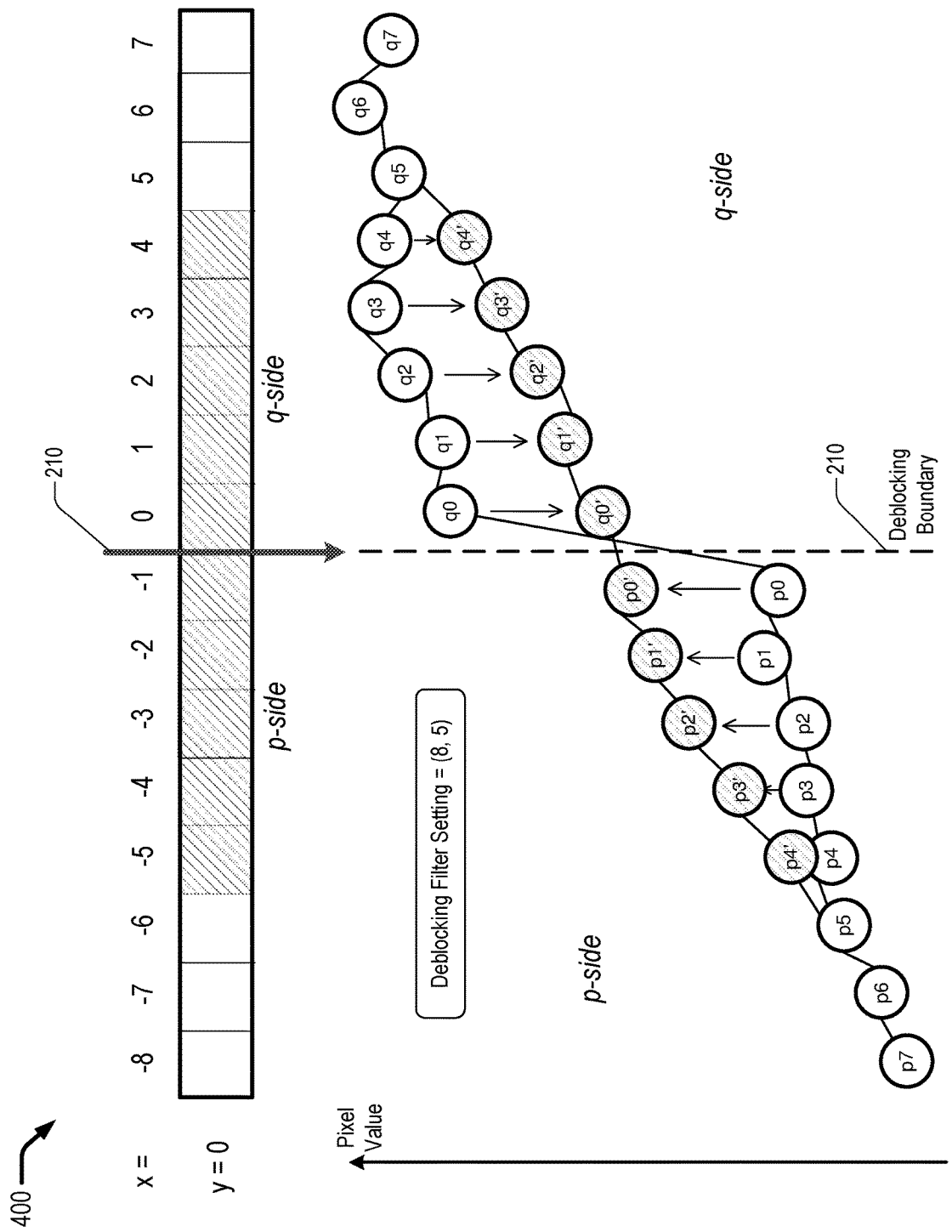
FIG. 4 is a diagram of an example design in accordance with an implementation of the present disclosure.

The horizontal filtering scheme 300 illustrates a deblocking filter setting of (8, 7). The two parameters of the filter setting represent the number of pixels referenced and the number of pixels updated, respectively. FIG. 4 is a diagram of an example design in accordance with an implementation of the present disclosure, wherein a horizontal filtering scheme 400 is illustrated for processing the same row as shown in FIG. 3. The horizontal filtering scheme 400 employs a deblocking filter setting of (8, 5). That is, according to the horizontal filtering scheme 400, the deblocking filter 110 would, on each side of a deblocking boundary, reference the first eight pixels and accordingly update the first five pixels. The deblocking filter 110 may use different filter settings for different blocks in a picture.

The horizontal filtering operation using the filtering scheme 300 is sequentially performed for each row that crosses the deblocking boundary 210. Namely, along the deblocking boundary 210, the deblocking filter 110 may perform the horizontal filtering operation by referencing $\{(-8, 0), (7, 0)\}$ and revising $\{(-7, 0), (6, 0)\}$, followed by referencing $\{(-8, 1), (7, 1)\}$ and revising $\{(-7, 1), (6, 1)\}$, and followed by referencing $\{(-8, 2), (7, 2)\}$ and revising $\{(-7, 2), (6, 2)\}$, and so on, until the deblocking filter 110 processes the last row that crosses the deblocking boundary 210, i.e., referencing $\{(-8, 15), (7, 15)\}$ and revising $\{(-7, 15), (6, 15)\}$.

Similarly, in an event that the horizontal filtering scheme 400 is employed rather than the horizontal filtering scheme 300, the deblocking filter 110 may perform the horizontal filtering operation for each row that crosses the deblocking boundary 210 sequentially. Namely, along the deblocking boundary 210, the deblocking filter 110 may perform the horizontal filtering operation by referencing $\{(-8, 0), (7, 0)\}$ and revising $\{(-5, 0), (4, 0)\}$, followed by referencing $\{(-8, 1), (7, 1)\}$ and revising $\{(-5, 1), (4, 1)\}$, and followed by referencing $\{(-8, 2), (7, 2)\}$ and revising $\{(-5, 2), (4, 2)\}$, and so on, until the deblocking filter 110 processes the last row that crosses the deblocking boundary 210, i.e., referencing $\{(-8, 15), (7, 15)\}$ and revising $\{(-5, 15), (4, 15)\}$.

The deblocking filter 110 may perform the horizontal filtering operation using a filtering scheme other than the filtering scheme 300 or 400. The deblocking filter 110 may utilize a horizontal filtering scheme that is defined by two parameters, the first parameter defining, for a row, how many pixels from a vertical deblocking boundary are referenced on each side of the vertical deblocking boundary, and the second parameter defining, for the row, how many pixels from the vertical deblocking boundary are accordingly revised on each side of the vertical deblocking boundary. The two parameters constitute a filter setting for processing the block.

Figure 5:
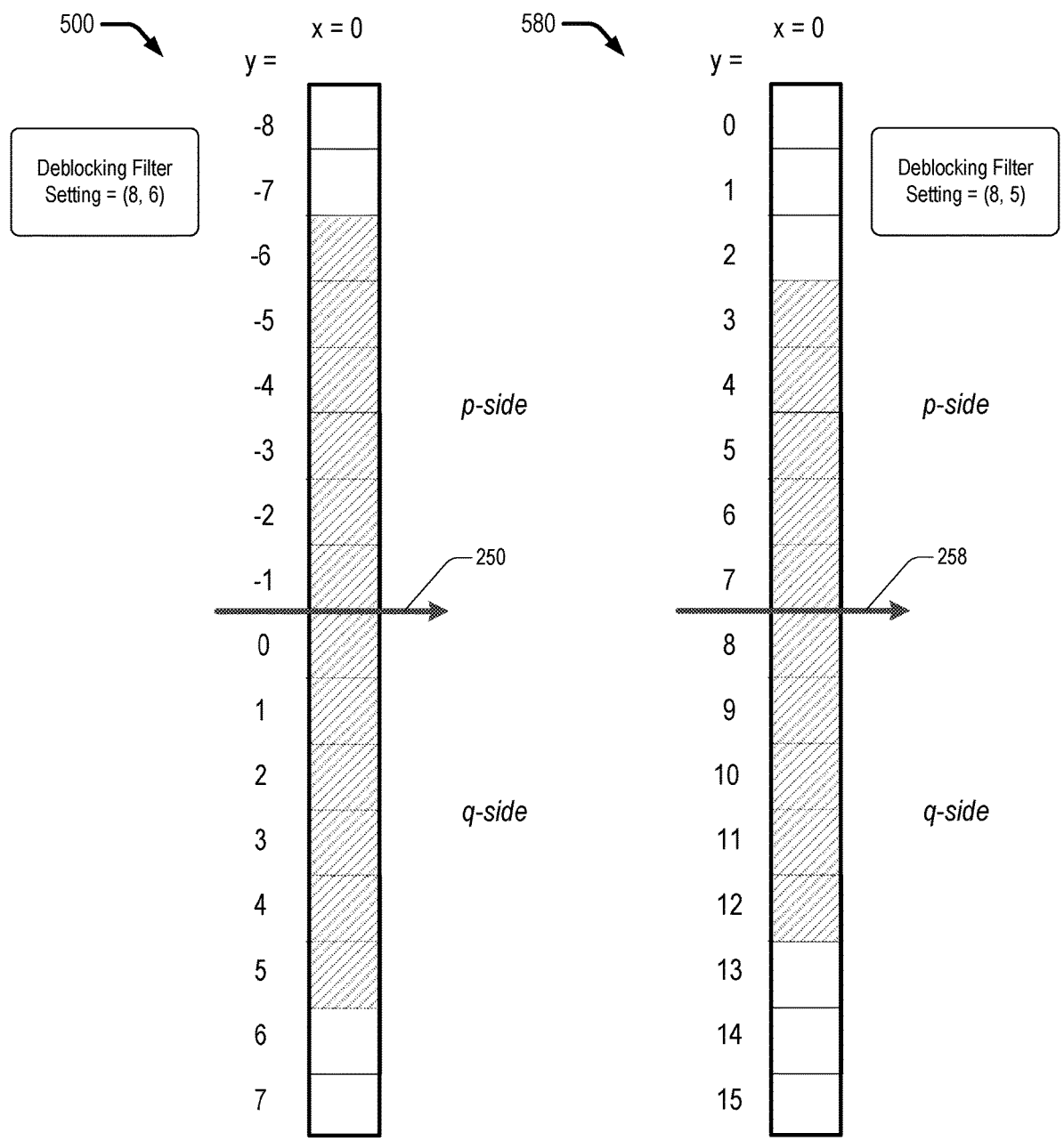
FIG. 5 is a diagram of an example design in accordance with an implementation of the present disclosure.

The deblocking filter 110 may apply same or similar filter settings for performing a vertical filtering operation along one or more imaginary horizontal lines of the block 168, such as the deblocking boundaries 250 and 258. FIG. 5 is a diagram of an example design in accordance with an implementation of the present disclosure, wherein vertical filtering schemes 500 and 580 are illustrated for performing a vertical filtering operation along the deblocking boundaries 250 and 258, respectively. Similar to the horizontal filtering operation employing the horizontal filtering scheme 300 or 400, in performing the vertical filtering operation the deblocking filter 110 may reference a first number of pixels on each side of the deblocking boundary 250 or 258 and accordingly revise a second number of pixels on each side of the deblocking boundary 250 or 258, whereas the first number and the second number are defined by the two parameters in the filter setting. For example, when the deblocking filter 110 performs a vertical filtering operation upon the x=0 column along the deblocking boundary 250 according to the filtering scheme 500 using a filter setting of (8, 6), the deblocking filter 110 may reference the eight pixels in {(0, −8), (0, −1)} on the p-side and the eight pixels in {(0, 0), (0, 7)} on the q-side, and then accordingly revise the twelve pixels in {(0, −6), (0, 5)}. Likewise, the deblocking filter 110 may perform a vertical filtering operation upon the x=0 column along the deblocking boundary 258 according to the filtering scheme 580 using a filter setting of (8, 5), wherein the deblocking filter 110 may reference the eight pixels in {(0, 0), (0, 7)} on the p-side and the eight pixels in {(0, 8), (0, 15)} on the q-side, and then accordingly revise the ten pixels in {(0, 3), (0, 12)}. The deblocking filter 110 may perform the vertical filtering operation along the deblocking boundaries 250 and 258 for each column that crosses the deblocking boundaries 250 and 258, respectively, one column after another. Namely, along the deblocking boundary 250, the deblocking filter 110 may perform the vertical filtering operation by referencing {(0, −8), (0, 7)} and revising {(0, −6), (0, 5)}, followed by referencing {(1, −8), (1, 7)} and revising {(1, −6), (1, 5)}, and followed by referencing {(2, −8), (2, 7)} and revising {(2, −6), (2, 5)}, and so on, until the deblocking filter 110 processes the last column that crosses the deblocking boundary 250, i.e., referencing {(15, −8), (15, 7)} and revising {(15, −6), (15, 5)}. Likewise, along the deblocking boundary 258, the deblocking filter 110 may perform the vertical filtering operation by referencing {(0, 0), (0, 15)} and revising {(0, 3), (0, 12)}, followed by referencing {(1, 0), (1, 15)} and revising {(1, 3), (1, 12)}, and followed by referencing {(2, 0), (2, 15)} and revising {(2, 3), (2, 12)}, and so on, until the deblocking filter 110 processes the last column that crosses the deblocking boundary 250, i.e., referencing {(15, 0), (15, 15)} and revising {(15, 3), (15, 12)}.

It is worth noting that, during the process of performing the horizontal filtering operation along the deblocking boundary 210, the deblocking filter 110 may operate on sub-blocks of the current block, as well as sub-blocks of one or more neighboring blocks. For example, in performing the horizontal filtering operation for the current block 168 along the deblocking boundary 210 using the horizontal filtering scheme 300, the deblocking filter 110 may reference pixel data in {(−8, 0), (−1, 15)} and revise pixel data in {(−7, 0), (−1, 15)}, both regions being in the neighboring block 167. Meanwhile, the deblocking filter 110 may reference pixel data in {(0, 0), (7, 15)} and revise pixel data in {(0, 0), (6, 15)}, both regions being in the current block 168.

Figure 6:
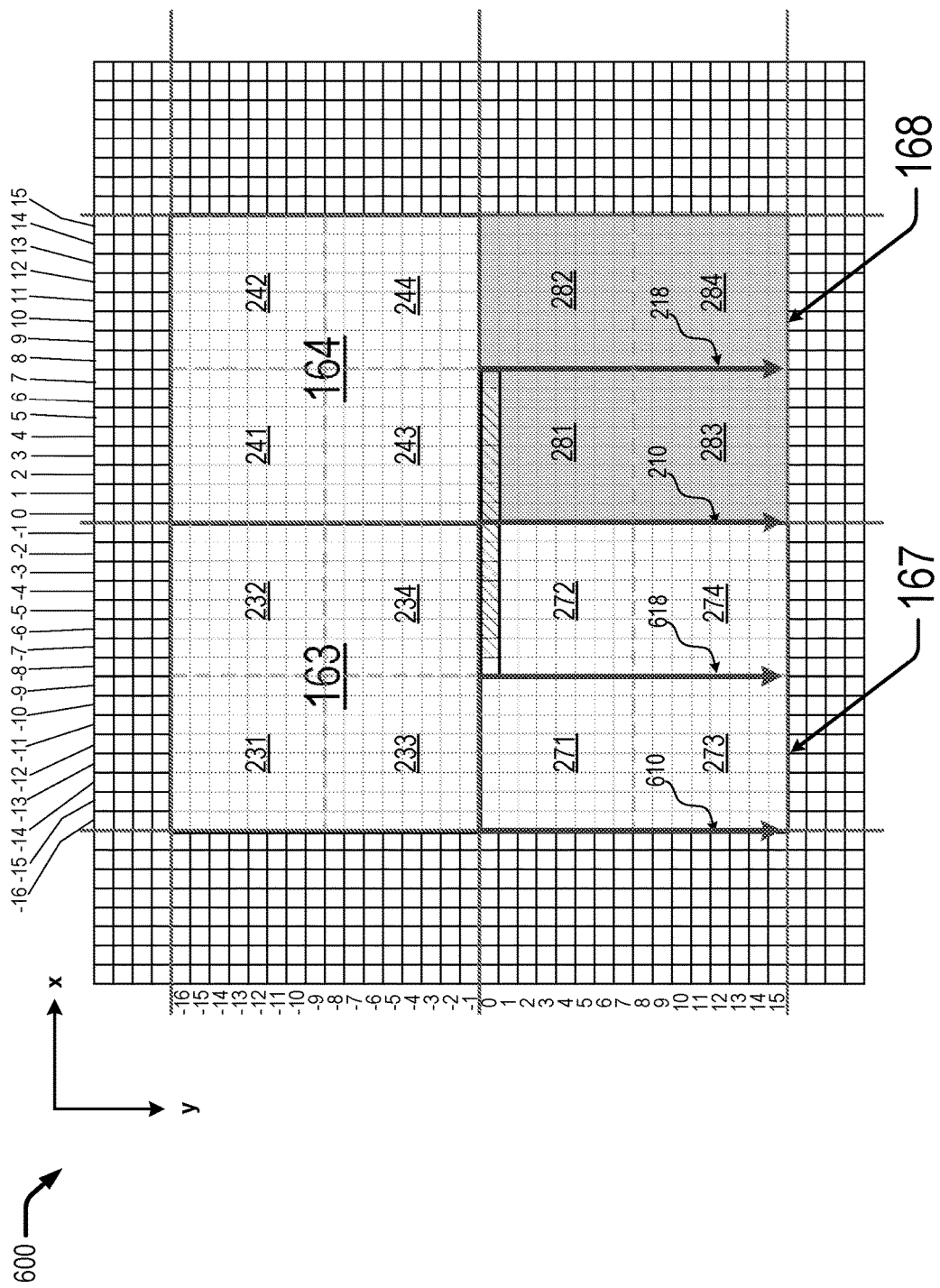
FIG. 6 is a diagram of an example design in accordance with an implementation of the present disclosure.

FIG. 6 is a diagram of an example design in accordance with an implementation of the present disclosure, wherein the deblocking filter 110 performs only the horizontal filtering operation but not the vertical filtering operation according to a deblocking filtering scheme 600. According to the deblocking filtering scheme 600, the deblocking filter 110 performs the horizontal filtering operation firstly along the deblocking boundaries 610 and 618 for the block 167, and then secondly along the deblocking boundaries 210 and 218 for the block 168. Through the process, pixel data in the sub-blocks 272 and 274 are revised twice, once as the q-side during the horizontal filtering performed along the deblocking boundary 618, and then once as the p-side during the horizontal filtering performed along the deblocking boundary 210. Namely, the sub-blocks 272 and 274 are only "partially filtered" when the deblocking filter 110 finishes processing the block 167. It is not until the deblocking filter 110 finishes the horizontal filtering along the deblocking boundary 210 that the sub-blocks 272 and 274 become "completely filtered". Similarly, pixel data in the sub-blocks 281 and 283 are revised twice, once as the q-side during the horizontal filtering performed along the deblocking boundary 210, and then another time as the p-side during the horizontal filtering performed along the deblocking boundary 218. Therefore, the sub-blocks 281 and 283 are fully filtered when the deblocking filter 110 finishes processing the block 168 along the deblocking boundaries 210 and 218, but the sub-blocks 282 and 284 will remain partially filtered until the deblocking filter 110 finishes processing the next block (i.e., the block immediately right to the block 168). In general, after the deblocking filter 110 finishes processing a block, a filtered block is generated as a result, which includes one or more completely filtered sub-blocks and one or more partially filtered sub-blocks. For example, after the deblocking filter 110 finishes processing the block 167, a filtered block is generated, which consists of two completely filtered sub-blocks 271 and 273, as well as two partially filtered sub-blocks 272 and 274. Likewise, after the deblocking filter 110 finishes processing the block 168, a filtered block is generated, which consists of two completely filtered sub-blocks 281 and 283, as well as two partially filtered sub-blocks 282 and 284. It is to be noted that, when the deblocking filter 110 finishes processing the block 168, the sub-blocks 272 and 274 are completely filtered. The deblocking filter 110 may output the completely filtered sub-blocks 272 and 274 along with the completely filtered sub-blocks 281 and 283 as an output block to the next filtering stage of the in-loop filtering pipeline 100, e.g., the SAO filter 120. The output block may serve as the next current block to be processed by the SAO filter 120 in the next pipeline cycle.

Although the deblocking filtering scheme 600 demonstrates performing only horizontal filtering along vertical deblocking boundaries (i.e., without vertical filtering), a deblocking filtering scheme wherein only vertical filtering operations are performed along horizontal deblocking boundaries (i.e., without horizontal filtering) may be readily derived from the deblocking filtering scheme 600 by swapping rows and columns in FIG. 6.

Similar scenarios are present when the deblocking filter 110 performs both the horizontal and vertical filtering operations. Refer back to FIG. 2, wherein the deblocking filter 110 performs both the horizontal and vertical filtering operations for each of the blocks 163, 164, 167 and 168. The horizontal filtering operation is performed along two vertical deblocking boundaries, such as the deblocking boundaries 210 and 218 of the block 168. The vertical filtering operation is also performed along two horizontal deblocking boundaries, such as the deblocking boundaries 250 and 258 of the block 168. When the deblocking filter 110 finishes processing the block 164, only the sub-block 241 is complete filtered, whereas the sub-blocks 242, 243 and 244 are only partially filtered, as pixel data of each of them may be revised again when the deblocking filter 110 processes some of the neighboring blocks of the block 164. For example, the pixel values of sub-blocks 243 and 244 may be revised again when the deblocking filter 110 processes the block 168 and performs the vertical filtering operation along the deblocking boundary 250. In fact, the sub-block 243 does not become completely filtered until the deblocking filter 110 finishes processing the block 168. At the time when the deblocking filter 110 finishes processing the block 164, the resulted filtered block, which includes a completely filtered sub-block 241 and three partially filtered sub-blocks 242-244, is stored in the memory 180 via the data bus 115 so that the deblocking filter 110 may fetch at least the partially filtered sub-blocks 243 and 244 when processing the block 168, e.g., when performing the vertical filtering operation along the deblocking boundary 250. Likewise, at the time when the deblocking filter 110 finishes processing the block 167, the resulted filtered block, which includes a completely filtered sub-block 271 and three partially filtered sub-blocks 272-274, is stored in the memory 180 via the data bus 115 so that the deblocking filter 110 may fetch at least the partially filtered sub-blocks 272 and 274 when processing the block 168, e.g., when performing the horizontal filtering operation along the deblocking boundary 210. At the time when the deblocking filter 110 finishes processing the block 168, the resulted filtered block, which includes a completely filtered sub-block 281 and three partially filtered sub-blocks 282-284, is stored in the memory 180 via the data bus 115 so that the deblocking filter 110 may fetch any of the partially filtered sub-blocks 282-284 when processing a neighboring block of the block 168, e.g., the block on the immediate right to the block 168 or the block immediately below the block 168.

The filtered block may include sub-blocks that overlap with the current block, as well as sub-blocks that overlap with one or more neighboring blocks to the current block. For example, after the deblocking filter 110 finishes processing the current block 168 using the deblock filtering scheme 200, a filtered block is generated. The filtered block may include one or more completely filtered sub-blocks, which are the sub-blocks 243, 272 and 281. These sub-blocks are completely filtered because their pixel values would not be revised again by the deblocking filter 110 processing any future block of the picture. Among the completely filtered sub-blocks, the sub-block 281 overlaps with the current block 168, whereas the sub-blocks 243 and 272 overlap with the neighboring blocks 164 and 167, respectively. The filtered block may also include one or more partially filtered sub-blocks, which are the sub-blocks 244, 274, 282, 283 and 284. These sub-blocks are partially filtered because their pixel values may be revised again by the deblocking filter 110 processing future blocks of the picture. For example, some pixel values of the sub-block 274 may be revised again when the deblocking filter 110 processes the block immediately below the block 167. As another example, some pixel values of the sub-block 284 may be revised again when the deblocking filter 110 processes the block immediately below or right to the block 168. Among the partially filtered sub-blocks, the sub-blocks 282-284 overlap with the current block 168, whereas the sub-blocks 244 and 274 overlap with the neighboring blocks 164 and 167, respectively.

Moreover, when the deblocking filter 110 finishes processing a block, an output block may be passed to the next filtering stage, wherein the output block includes one or more completely filtered sub-blocks. For example, at the time when the deblocking filter 110 finishes processing the block 168, the deblocking filter 110 may output an output block comprising the completely filtered sub-blocks 234, 243, 272 and 281. The output block may be passed from the deblocking filter 110 to the SAO filter 120 via the data bus 119, with the output block being the next current block to be processed by the SAO filter 120 in the next pipeline cycle.

The example embodiments presented with FIGS. 2-6 are based on the deblocking filter 110 being an eight-tap filter, i.e., referencing eight pixels on each of the p-side and the q-side when performing the horizontal operation and/or the vertical filtering operation along the deblocking boundaries. The same method may be applied to a deblocking filter of any number of taps. Assume that the deblocking filter 110 is an $N_{ref}$-tap filter, where $N_{ref}$ is a positive integer. According to a design of the present disclosure, the deblocking filter 110 may receive several blocks encompassing a rectangular area of $\{(-N, -N), (N-1, N-1)\}$ of a picture. The rectangular area of $\{(-N, -N), (N-1, N-1)\}$ may include a current block $\{(0, 0), (N-1, N-1)\}$, as well as three neighboring blocks of the current block, i.e., $\{(-N, -N), (-1, -1)\}$, $\{(0, -N), (N-1, -1)\}$ and $\{(-N, 0), (-1, N-1)\}$. The deblocking filter 110 may perform horizontal and vertical filtering operations on the current block, thereby generating a filtered block comprising one completely filtered sub-block $\{(0, 0), (N_{ref}-1, N_{ref}-1)\}$, as well as three partially filtered sub-blocks $\{(0, N_{ref}), (N_{ref}-1, N-1)\}$, $\{(N_{ref}, 0), (N-1, N_{ref}-1)\}$ and $\{(N_{ref}, N_{ref}), (N-1, N-1)\}$. The deblocking filter 110 may output an output block $\{(-N_{ref}, -N_{ref}), (N-N_{ref}-1, N-N_{ref}-1)\}$, which includes four completely filtered sub-blocks, to the SAO filter 120. In the example embodiments shown in FIGS. 2-5, $N=16, N_{ref}=8$.

IX. SAO Filter

Figure 7:
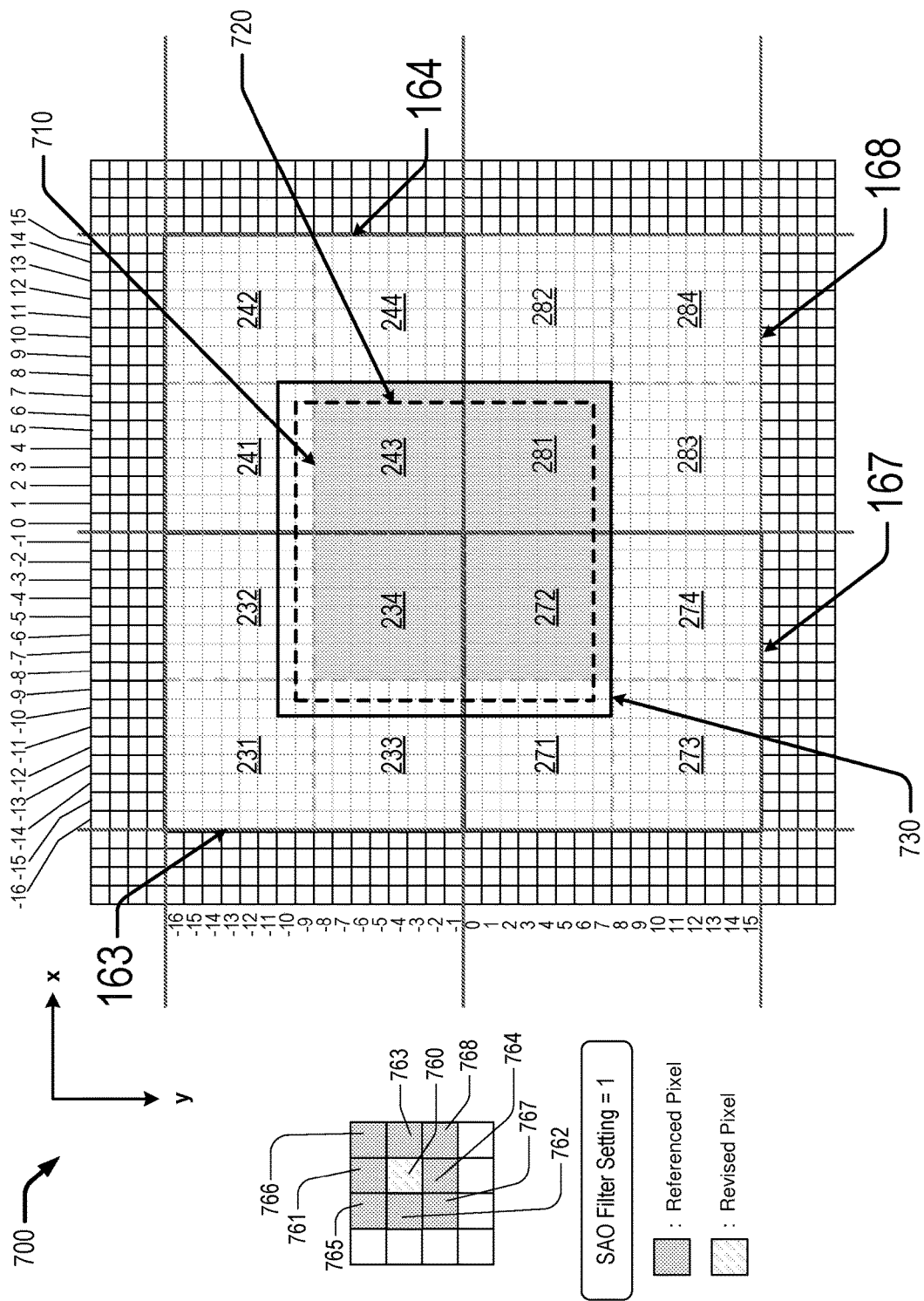
FIG. 7 is a diagram of an example design in accordance with an implementation of the present disclosure.

As described above, the output block passed from the deblocking filter 110 to the SAO filter 120 becomes the current block to be processed by the SAO filter 120 in the next pipeline cycle. FIG. 7 is a diagram of an example design in accordance with an implementation of the present disclosure, wherein a SAO filtering scheme 700 is illustrated for processing a current block 710 by the SAO filter 120. The current block 710, which is the resulted output block from the deblocking filter 110, includes the completely filtered sub-blocks (from the deblocking filter 110's point of view) 234, 243, 272 and 281. The current block 710 has been passed from the deblocking filter 110 via the data bus 119. The SAO filter 120 performs an SAO filtering operation according to a filter setting of one parameter, wherein the parameter specifies how many pixels in each direction from a pixel in the current block are referenced, based on which the pixel value of the current pixel is updated or otherwise revised. Namely, the SAO filtering operation is a pixel-by-pixel operation. As shown in FIG. 7, the SAO filtering scheme 700 employs a SAO filter setting of 1 pixel. Take a pixel 760 of the current block 710 for example. In some embodiments, the SAO filter 120 may reference 1 adjacent pixel in each of a left direction, a right direction, a top direction, and a bottom direction with respect to the pixel 760, and then revise the pixel 760 accordingly. That is, the SAO filter 120 may reference pixels 761, 762, 763 and 764, based on which the SAO filter 120 may revise the value of the pixel 760. In some embodiments, the SAO filter 120 may further reference 1 adjacent pixel in each of a top-left direction, a top-right direction, a bottom-left direction, and a bottom-right direction with respect to the pixel 760. That is, the SAO filter 120 may further reference pixels 765, 766, 767 and 768 during the SAO filtering operation. Based on the pixel values of the pixels 761-768, the SAO filter 120 may revise the value of the pixel 760 accordingly. The SAO filtering operation may be employed to reduce a ringing artifact resulted from block-based inter/intra prediction performed by the inter/intra prediction module 103. Therefore, the SAO filter 120 may also be referred to as a "de-ringing filter".

Since the in-loop filter 100 is designed to operate in a pipeline fashion, each stage of the in-loop filter 100 is preferred to output an output block of a same size. The pixel data directly received from the deblocking filter 110 is not sufficient for the SAO filter 120 to generate an output block that is of the same size as the output block of the deblocking filter 110, i.e., the current block 710. In order to generate an output block that is of the same size as the current block 710, the SAO filter 120 is required to receive extra pixel data from one or more neighboring blocks of the block 168. As shown in FIG. 7, in order to generate an output block 720, which is of the same size as the current block 710, the SAO filter 120 is required to receive pixel data represented by an input block 730, which includes the current block 710 and the area consisting of {(−10, −10), (7, −9)} and {(−10, −8), (−9, 7)}, i.e., the L-shaped area that is within the input block 730 but outside the current block 710. While the current block 710 is directly passed from the deblocking filter 110 to the SAO filter 120 via the data bus 119, the SAO filter 120 needs to fetch the pixel data of the L-shaped area from the memory 180 via the data bus 125. As described elsewhere herein above, fetching data from the memory 180 is a slow process. Namely, latency is introduced in the SAO filter 120 for its need to fetch the pixel data of the L-shaped area from the memory 180. The more pixel data the SAO filter 120 is required to fetch from the memory 180 instead of receiving from the deblocking filter 110, the worse the latency.

Figure 8:
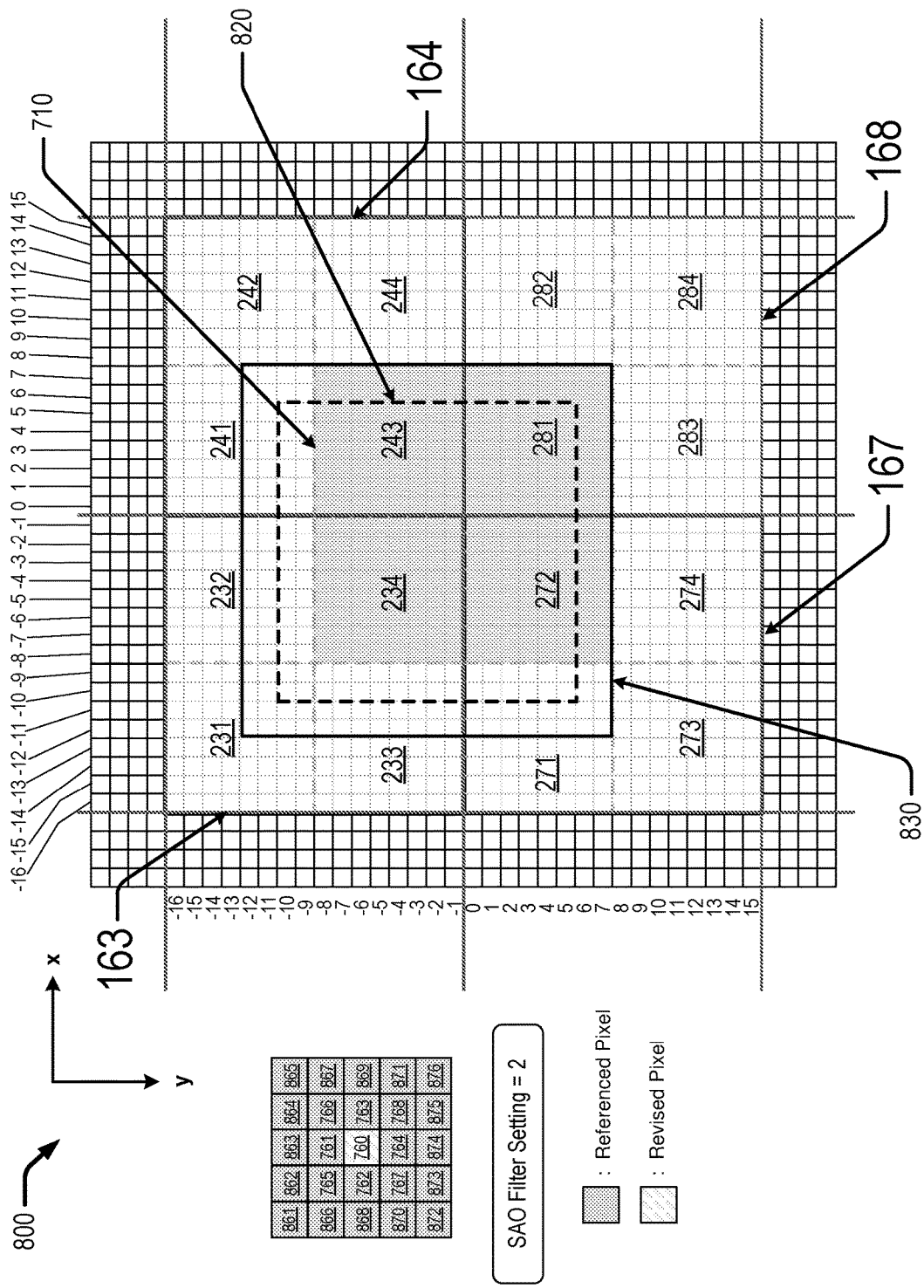
FIG. 8 is a diagram of an example design in accordance with an implementation of the present disclosure.

For instance, a SAO filter setting of 2 pixels may exacerbate the latency introduced from fetching pixel data from the memory 180. FIG. 8 is a diagram of an example design in accordance with an implementation of the present disclosure, wherein a SAO filtering scheme 800 is illustrated for processing a current block 710 by the SAO filter 120. As shown in FIG. 8, the SAO filtering scheme 800 employs a SAO filter setting of two pixels. Namely, the SAO filter 120 revises a pixel based on the pixel values of two adjacent pixels in every direction with respect to the pixel. Take the pixel 760 of the current block 710 for example. As shown in FIG. 8, the SAO filter setting of 2 pixels requires the SAO filter 120 to reference two adjacent pixels in every direction from the pixel 760, which is collectively represented by a square matrix of 25 pixels, with the pixel 760 in the middle of the matrix and 24 surrounding pixels around the pixel 760. The first layer of the matrix includes the 8 pixels that are immediately adjacent to the pixel 760, i.e., the pixels 761-768. The second layer of the matrix, i.e., the next pixel layer surrounding the first layer, includes an additional 16 pixels comprising pixels 861-876.

Similar to the SAO filtering scheme 700, for generating an output block that is of the same size as the current block 710 using the SAO filtering scheme 800, the SAO filter 120 is required to receive extra pixel data from one or more neighboring blocks of the block 168, in addition to the current block 710. As shown in FIG. 8, in order to generate an output block 820, which is of the same size as the current block 710, the SAO filter 120 is required to receive pixel data represented by an input block 830, which includes the current block 710 and the area consisting of {(−12, −12), (7, −9)} and {(−12, −8), (−9, 7)}, i.e., the L-shaped area that is within the input block 830 but outside the current block 710. While the current block 710 is directly passed from the deblocking filter 110 to the SAO filter 120 via the data bus 119, the SAO filter 120 needs to fetch the pixel data of the L-shaped area from the memory 180 via the data bus 125. Given that the L-shaped area of FIG. 8 is larger than the L-shaped area of FIG. 7, the SAO filtering scheme 800 is expected to introduce more latency than the SAO filtering scheme 700.

It is worth noting that the pixel data of L-shaped area, as described above for each of the SAO filtering schemes 700 and 800, is resulted from the deblocking process previously performed by the deblocking filter 110 and subsequently saved in the memory 180 via the bus 115. The pixel data is then retrieved by the SAO filter 120 from the memory 180 via the bus 125 while the SAO filter 120 processes the current block. In some alternative embodiments, however, the pixel data of the L-shaped area, as retrieved from the memory 180, may already be processed by the SAO filter 120, as described herein below.

In some embodiments of the SAO filtering scheme 700, in addition to reading or fetching pixel data from the memory 180 for performing the SAO filtering operation, the SAO filter 120 may further write or store pixel data of at least a portion of the resulted output block (e.g., the output block 720 or 820) to the memory 180 for future reference, i.e., being fetched by the SAO filter 120 when the SAO filter 120 processes other blocks in the future. In the SAO filtering scheme 700, after the output block 720 is generated, the SAO filter 120 may store to the memory 180 via the data bus 125 an L-shaped area consisting of the right-most column and the bottom-most row of the output block 720, as well as the right-most column and the bottom-most row of the current block 710. The SAO filter 120 may access the memory 180 via the data bus 125 to fetch certain pixel data of the L-shaped area when processing future blocks. For example, the SAO filter 120 may fetch the right-most column of the output block 720 and the right-most column of the current block 710 when processing a block immediately right to the block 710. The SAO filter 120 may fetch the bottom-most row of the output block 720 and the bottom-most row of the current block 710 when processing a block immediately below the block 710.

Likewise, in some embodiments of the SAO filtering scheme 800, after the output block 820 is generated, the SAO filter 120 may store to the memory 180 via the data bus 125 an L-shaped area consisting of the two right-most columns and the two bottom-most rows of the output block 820, as well as the two right-most columns and the two bottom-most rows of the current block 710. Namely, the L-shaped area is represented by a combination of {(4, −12), (7, 7)} and {(−12, 4), (7, 7)}. The SAO filter 120 may access the memory 180 via the data bus 125 to fetch certain pixel data of the L-shaped area when processing future blocks. For example, the SAO filter 120 may fetch {(4, −12), (7, 7)} when processing a block immediately right to the block 710. The SAO filter 120 may fetch {(−12, 4), (7, 7)} when processing a block immediately below the block 710. The L-shaped area has two segments, the first segment being {(4, −12), (7, 7)}, and the second segment being {(−12, 4), (7, 7)}. Each of the two segment has a width that is twice the SAO filter setting being employed. For the SAO filtering scheme 800, the SAO filter setting=2 (i.e., two pixels), therefore each of the two segments of the L-shaped area has a width of 4 pixels. For the SAO filtering scheme 700, the SAO filter setting=1 (i.e., one pixel), therefore each of the two segments of the L-shaped area has a width of 2 pixels.

Moreover, the SAO filter 120 may output the output block 720 or 820 to the next filtering stage of the in-loop filtering pipeline 100, e.g., the ALF 130. The ALF 130 may use the output block 720 or 820 as the next current block to be processed in the next pipeline cycle.

The example embodiments presented with FIG. 7 and FIG. 8 are based on the SAO filter 120 being a one-tap filter (i.e., the filter setting=1 pixel) and a two-tap filter (i.e., the filter setting=2 pixels), respectively. A one-tap SAO filter revises a specific pixel by referencing the most adjacent one pixel of the specific pixel in all directions, i.e., the first layer of 8 pixels surrounding the specific pixel. A two-tap SAO filter revises a specific pixel by referencing the two most adjacent pixels in all directions, i.e., the first layer of 8 pixels surrounding the specific pixel plus the second layer of 16 additional pixels surrounding the first layer. The same method may be applied to a SAO filter of any number of taps. Assume that the SAO filter 120 is an $N_{f2}$-tap filter (i.e., the filter setting=$N_{f2}$ pixels), wherein $N_{f2}$ is a positive integer. According to a design of the present disclosure, the SAO filter 120 may receive the output block of the deblocking filter 110, i.e., the block $\{(-N_{ref}, -N_{ref}), (N-N_{ref}-1, N-N_{ref}-1)\}$, as the current block 710 of the SAO filter 120. The SAO filter 120 may further access the memory 180 to fetch pixel data of an L-shaped region of an input block (e.g., the input block 730 or 830), the L-shaped area being a combination of $\{(-N_{ref}-2N_{f2}, -N_{ref}-2N_{f2}), (N-N_{ref}-1, -N_{ref}-1)\}$ and $\{(-N_{ref}-2N_{f2}, -N_{ref}), (-N_{ref}-1, N-N_{ref}-1)\}$. The SAO filter 120 may perform a SAO filtering operation, such as the SAO filtering scheme 700 or 800, and accordingly output a filtered block (e.g., the output block 720 or 820), i.e., $\{(-N_{ref}-N_{f2}, -N_{ref}-N_{f2}), (N-N_{ref}-1-N_{f2}, N-N_{ref}-1-N_{f2})\}$. In some embodiments, the SAO filter 120 may store pixel data represented by an L-shaped region of the output block in the memory 180 for the SAO filter 120 to process future blocks, wherein the L-shaped region is represented by a combination of $\{(N-N_{ref}-2N_{f2}, -N_{ref}-2N_{f2}), (N-N_{ref}-1, N-N_{ref}-1)\}$ and $\{(-N_{ref}-2N_{f2}, N-N_{ref}-2N_{f2}), (N-N_{ref}-1-2N_{f2}, N-N_{ref}-1)\}$.

X. Low-Latency Data Schemes

As described above, each of the SAO filtering schemes 700 and 800 requires accessing (e.g., reading pixel data from and/or writing pixel data to) the memory 180. It is also described above that accessing the memory 180 is a slow process, which adds to the processing latency of the SAO filter 120. Measures for reducing the memory access are preferred so that the latency can be reduced. For example, the latency may be reduced if the SAO filter 120 is required to fetch less pixel data from the memory 180. Also, the latency may be reduced if the SAO filter 120 is required to store less pixel data to the memory 180.

Figure 9:
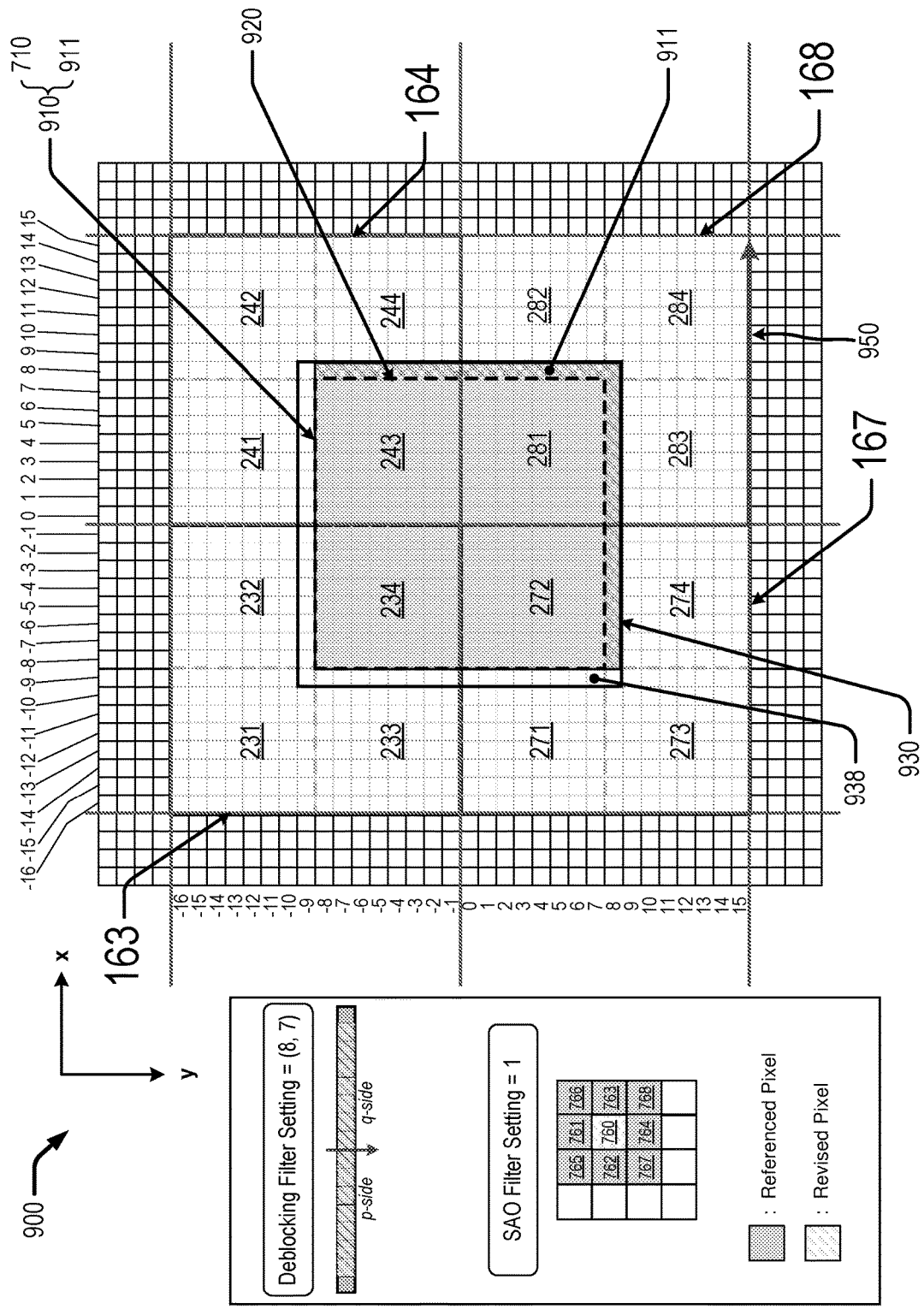
FIG. 9 is a diagram of an example design in accordance with an implementation of the present disclosure.

FIG. 9 illustrates an example design in accordance with an implementation of the present disclosure, wherein a data scheme 900 is presented for the combination of the deblocking filter 110 and the SAO filter 120. In the data scheme 900, the deblocking filter 110 employs a filter setting of (8, 7), and the SAO filter 120 employs a filter setting of 1 pixel. The deblocking filter 110 has performed both horizontal filtering and vertical filtering for the blocks 163, 164, 167 and 168. For example, the deblocking filter 110 has performed the horizontal filtering for the block 168 along the deblocking boundaries 210 and 218 using the deblocking filtering scheme 300. In addition, the deblocking filter 110 has also performed the vertical filtering using the filtering setting of (8, 7) for the block 168 along the deblocking boundaries 250 and 258. According to the data scheme 900, after the deblocking filter 110 finishes processing the block 168, the deblocking filter 110 may output to the SAO filter 120 an output block 910 that includes not only the completely filtered sub-blocks 234, 243, 272 and 281, but also an L-shaped area 911. Namely, the output block 910 according to the data scheme 900 is the L-shaped area 911 annexed to the output block 710. As described elsewhere herein below, the inclusion of the L-shaped area 911 into the output block 910, which serves as the next current block of the SAO filter 120, is helpful in reducing the amount of pixel data that the SAO filter 120 is required to fetch from the memory 180, thereby reducing the latency introduced in the SAO filter 120.

The L-shaped area 911 consists of a respective portion of each of the partially filtered sub-blocks 244, 274, 282, 283 and 284. Specifically, the L-shaped area 911 consists of a portion of the sub-block 274 (i.e., $\{(-8, 8), (-1, 8)\}$), a portion of the sub-block 283 (i.e., $\{(0, 8), (7, 8)\}$), a portion of the sub-block 284 (i.e., the pixel (8, 8)), a portion of the sub-block 282 (i.e., $\{(8, 0), (8, 7)\}$), and a portion of the sub-block 244 (i.e., $\{(8, -8), (8, -1)\}$). It is worth noting that each of the portions is adjacent to one of the completely filtered sub-blocks 234, 243, 272 and 281. Specifically, the portion of the partially filtered sub-block 274 (i.e., $\{(-8, 8), (-1, 8)\}$) is edge-adjacent to the completely filtered sub-block 272; the portion of the partially filtered sub-block 283 (i.e., $\{(0, 8), (7, 8)\}$) is edge-adjacent to the completely filtered sub-block 281; the portion of the partially filtered sub-block 284 (i.e., the pixel (8, 8)) is corner-adjacent to the completely filtered sub-block 281; the portion of the partially filtered sub-block 282 (i.e., $\{(8, 0), (8, 7)\}$) is edge-adjacent to the completely filtered sub-block 281; the portion of the partially filtered sub-block 244 (i.e., $\{(8, -8), (8, -1)\}$) is edge-adjacent to the completely filtered sub-block 243.

It is worth noting that pixels of the L-shaped region 911 are not expected to be revised or otherwise updated from the deblocking filter 110 processing future blocks, since the deblocking filter setting=(8, 7) is employed by the deblocking filter 110. Therefore, the pixels of the L-shaped region 911 are ready to be used by the SAO filter 120 even though the pixels of the L-shaped region 911 belong to partially filtered sub-blocks. For example, even though pixels $\{(0, 8), (7, 8)\}$ of the L-shaped region 911 belong to the partially filtered sub-block 283, the pixels are not to be further revised by a vertical deblocking filtering operation along a deblocking boundary 950, as the pixels $\{(0, 8), (7, 8)\}$ are the $8^{th}$ pixels on the p-side of the deblocking boundary 950, which are only to be referenced but not revised by the vertical deblocking filtering operation along the deblocking boundary 950.

The L-shaped region 911 includes two segments, i.e., a horizontal segment having pixels of $\{(-8, 8), (8, 8)\}$ and a vertical segment having pixels of $\{(8, -8), (8, 8)\}$. The difference between the two parameters of the deblocking filter setting (i.e., 8-7=1 pixel) is equal to the width of each of the horizontal and vertical segments of the L-shaped region 911. In an event that two different filter settings are employed by the deblocking filter 110 for performing the vertical and horizontal filtering operations, respectively, the width of the horizontal segment of the L-shaped region 911 can be equal to or less than the difference between the two parameters of the filter setting used with the vertical filtering operation, whereas the width of the vertical segment of the L-shaped region 911 can be equal to or less than the difference between the two parameters of the filter setting used with the horizontal filtering operation. For example, the deblocking filter 110 may employ the horizontal filtering scheme 400, which has a deblocking filter setting of (8, 5), and the vertical filtering scheme 500, which has a deblocking filter setting of (8, 6), for processing the blocks 163, 164, 167 and 168. It follows that the horizontal segment of the L-shaped region 911 may have a width of 8−6=2 pixels at most, whereas the vertical segment of the L-shaped region 911 may have a width of 8−5=3 pixels at most. Specifically, the horizontal segment of the L-shaped region 911 may be as wide as the region of $\{(-8, 8), (10, 9)\}$, whereas the vertical segment of the L-shaped region 911 may be as wide as the region of $\{(8, -8), (10, 9)\}$.

The inclusion of the L-shaped region 911 in the output block 910 of the deblocking filter 110 reduces the pixel data that is required to be fetched from the memory 180 by the SAO filter 120. Moreover, a saving in the number of pixels fetched from the memory 180 is equal to the number of pixels contained in the L-shaped region 911. As shown in FIG. 9, the inclusion of the L-shaped region 911 in the output block 910 (of the deblocking filter 110) enables the SAO filter 120 to generate an output block 920 (of the SAO filter 120) using pixel data represented by an input block 930 (of the SAO filter 120). The output block 920 overlaps exactly with the combination of the completely filtered sub-blocks 234, 243, 272 and 281, and thus has the same size as the output block 720 or 820, although the location of the output block 920 is shifted from that of the output block 720 or 820. The input block 930 consists of the output block 910 and an L-shaped region 938 consisting of $\{(-9, -9), (-9, 8)\}$ and $\{(-9, -9), (8, -9)\}$. From the SAO filter 120's point of view, the SAO filter 120 receives the input block 930 by receiving the output block 910 (including the output block 710 and the L-shaped region 911) directly from the deblocking filter 110 via the data bus 119, followed by receiving the L-shaped region 938 from the memory 180 via the data bus 125. Compared with the SAO filtering scheme 700, wherein the SAO filter 120 is required to fetch pixel data of the L-shaped area $\{(-10, -10), (7, -9)\}$ and $\{(-10, -8), (-9, 7)\}$ from the memory 180, the data scheme 900 only requires the SAO filter 120 to fetch pixel data of the L-shaped region 938 from the memory 180, which is substantially a 50% reduction in the amount of pixel data fetched. The 50% reduction in the amount of pixel data fetched translates to substantially a 50% reduction in latency introduced in the SAO filter 120, thereby greatly improving the processing efficiency of the in-loop filter 100.

In some embodiments, the SAO filter 120 may store the pixel data of the L-shaped region 911 as received from the deblocking filter 110 to the memory 180 via the bus 125, so that the pixel data of the L-shaped region 911 may be retrieved again by the SAO filter 120 for processing future blocks. That is, in addition to receiving the pixel data of the L-shaped region 911 from the deblocking filter 110 and performing the SAO filtering operation using the pixel data of the L-shaped region 911, the SAO filter 120 may further store the pixel data of the L-shaped region 911 to the memory 180. In some alternative embodiments, however, the SAO filter 120 may update the pixel data of the L-shaped region 911 before storing the pixel data to the memory 180. That is, the pixel data of the L-shaped region 911 may be updated as a result of the SAO filter 120 performing the SAO filtering operation of the current block, and then be stored to the memory 180 for future use.

Figure 10:
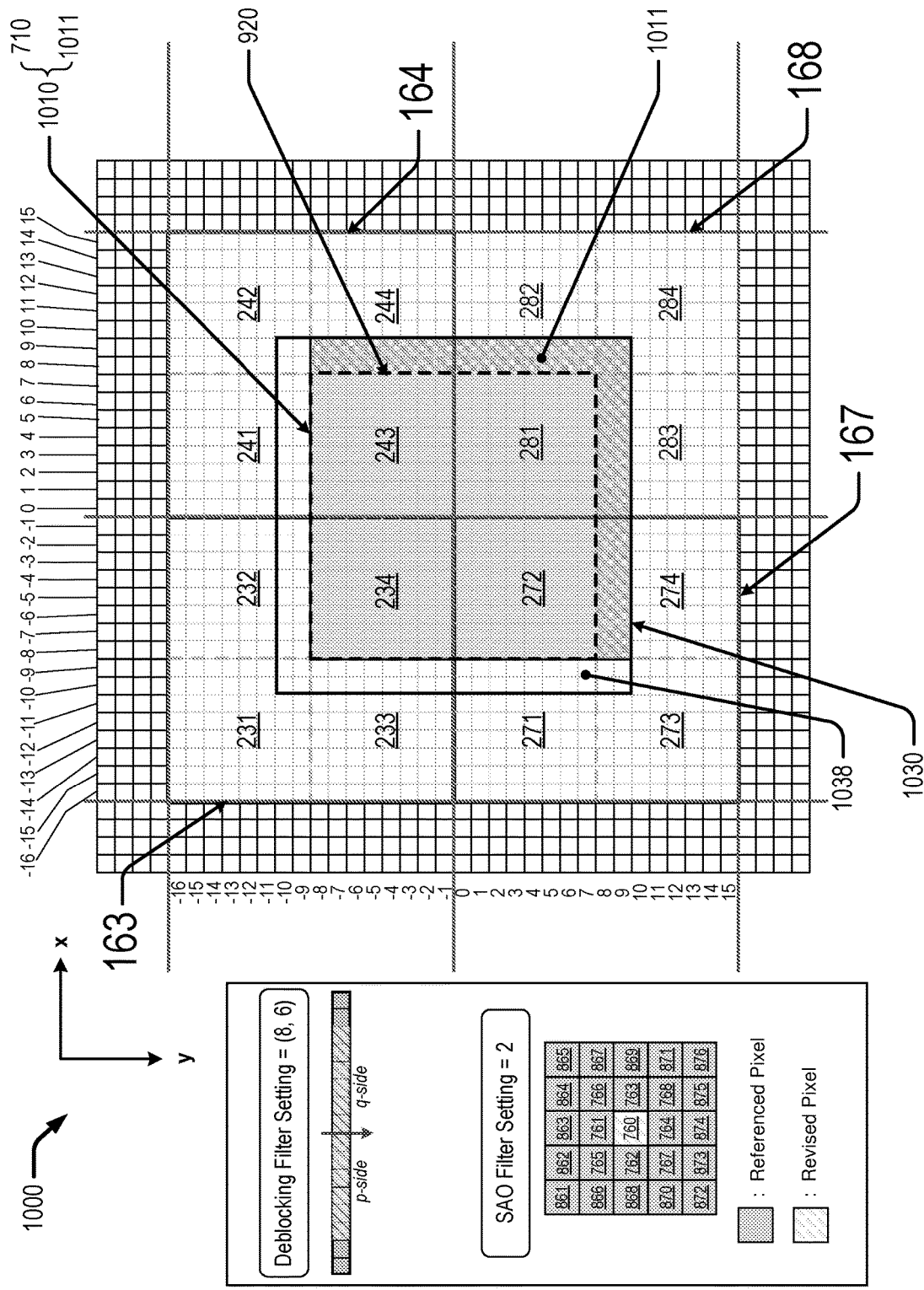
FIG. 10 is a diagram of an example design in accordance with an implementation of the present disclosure.

FIG. 10 illustrates an example design in accordance with an implementation of the present disclosure, wherein a data scheme 1000 is presented for the combination of the deblocking filter 110 and the SAO filter 120. In the data scheme 1000, the deblocking filter 110 employs a filter setting of (8, 6), and the SAO filter 120 employs a filter setting of 2 pixels. The deblocking filter 110 has performed both horizontal filtering and vertical filtering for the blocks 163, 164, 167 and 168. For example, the deblocking filter 110 has performed the horizontal filtering for the block 168 along the deblocking boundaries 210 and 218 using the filtering setting of (8, 6). In addition, the deblocking filter 110 has also performed the vertical filtering for the block 168 using the filtering setting of (8, 6) along the deblocking boundaries 250 and 258. According to the data scheme 1000, after the deblocking filter 110 finishes processing the block 168, the deblocking filter 110 may output to the SAO filter 120 an output block 1010 that includes not only the completely filtered sub-blocks 234, 243, 272 and 281, but also an L-shaped area 1011. Namely, the output block 1010 according to the data scheme 1000 is the L-shaped area 1011 annexed to the output block 710. Similar to the data scheme 900, the inclusion of the L-shaped area 1011 into the output block 1010, which serves as the next current block of the SAO filter 120, is helpful in reducing the amount of pixel data that the SAO filter 120 is required to fetch from the memory 180, thereby reducing the latency introduced in the SAO filter 120.

Similar to the data scheme 900, in the data scheme 1000, a saving in the number of pixels fetched from the memory 180 is equal to the number of pixels contained in the L-shaped region 1011. As shown in FIG. 10, the inclusion of the L-shaped region 1011 in the output block 1010 (of the deblocking filter 110) enables the SAO filter 120 to generate the output block 920 (of the SAO filter 120) using pixel data represented by an input block 1030 (of the SAO filter 120). The output block 920 has the same size as the output block 720 or 820, although the location of the output block 920 is shifted from that of the output block 720 or 820. The input block 1030 consists of the output block 1010 and an L-shaped region 1038 consisting of $\{(-10, -10), (-9, 9)\}$ and $\{(-10, -10), (9, -9)\}$. From the SAO filter 120's point of view, the SAO filter 120 receives the input block 1030 by receiving the output block 1010 (including the output block 710 and the L-shaped region 1011) directly from the deblocking filter 110 via the data bus 119, and by receiving the L-shaped region 1038 from the memory 180 via the data bus 125. Compared with the SAO filtering scheme 800, wherein the SAO filter 120 is required to fetch pixel data of the L-shaped area $\{(-12, -12), (7, -9)\}$ and $\{(-12, -8), (-9, 7)\}$ from the memory 180, the data scheme 1000 only requires the SAO filter 120 to fetch pixel data of the L-shaped region 1038 from the memory 180, which is more than a 50% reduction in the amount of pixel data fetched. The reduction in the amount of pixel data fetched translates to substantially a 50% reduction in latency introduced in the SAO filter 120, thereby greatly improving the processing efficiency of the in-loop filter 100. It is worth noting that, in the data schemes 900 and 1000, even though the amount of the extra pixel data output by the deblocking filter 110 (e.g., the L-shaped region 911 or 1011) is roughly the same as the reduction in the amount of pixel data the SAO filter 120 needs to fetch from the memory 180, the overall latency of the in-loop filter 100 is still improved by employing the data scheme 900 or 1000. This is because the speed of transferring data from the deblocking filter 110 to the SAO filter 120 via the data bus 119 is much faster than the that between the SAO filter 120 and the memory 180 via the data bus 125.

Since the data schemes 900 and 1000 involve both the deblocking filter 110 and the SAO filter 120, it is to be noted that the sizes of the L-shaped area 911 and 1011 are determined not only by the filter setting employed by the deblocking filter 110 but also by the filter setting employed by the SAO filter 120. Specifically, the sizes of the L-shaped area 911 and 1011 are dictated by the more stringent or strict requirement between the filter setting employed by the deblocking filter 110 and the filter setting employed by the SAO filter 120. For example, in an event that the deblocking filter 110 employs a filter setting of (8, 6) for both horizontal and vertical filtering and the SAO filter 120 employs a filter setting of 1 pixel, the output block sent from the deblocking filter 110 to the SAO filter 120 via the data bus 119 would be the block 910 rather than the block 1010. This is because the block 910 already contains all the pixel data that the SAO filter 120 needs from the deblocking filter 110 for generating the output block 920, and the extra data contained in the block 1010 as compared with the block 910 will not be used by the SAO filter 120 regardless. For another example, in an event that the deblocking filter 110 employs a filter setting of (8, 7) for both horizontal and vertical filtering and the SAO filter 120 employs a filter setting of 2 pixels, the output block sent from the deblocking filter 110 to the SAO filter 120 via the data bus 119 would also be the block 910 rather than the block 1010. This is because even though the SAO filter 120 needs all the pixel data in the L-shaped region 1011 for generating the output block 920, the deblocking filter 110 is incapable of providing at least a part of the pixel data in the L-shaped region 1011 to the SAO filter 120. Specifically, the deblocking filter 110 is incapable of providing pixel data in the areas of {(−8, 9), (9, 9)} or {(9, −8), (9, 9)}, as pixel values in those areas may be further revised by the deblocking filter 110 processing future blocks, e.g., performing a vertical filtering operation along the deblocking boundary 950. Namely, the width of each of the horizontal and vertical segments of the L-shaped region 911 or 1011 may be represented by $$W_L = \min(N_{f2}, N_{ref} - N_{rev}), \qquad (1)$$

wherein $N_{ref}$ is the first parameter of the filter setting of the deblocking filter 110, which defines the number of pixels on each of the p-side and q-side of a deblocking boundary that are referenced, wherein $N_{rev}$ is the second parameter of the filter setting of the deblocking filter 110, which defines the number of pixels on each of the p-side and q-side of a deblocking boundary that are revised or updated, and wherein $N_{f2}$ is the parameter of the filter setting of the SAO filter 120, which defines the number of pixels referenced in each direction from a respective pixel for revising the pixel value of the respective pixel.

As described elsewhere herein above, the respective inclusion of the L-shaped regions 911 and 1011 into the output blocks 910 and 1010 reduces the amount of pixel data the SAO filter 120 needs to fetch from the memory 180. The reduction of the pixel data fetched from the memory 180 translates into not only a latency improvement, as described above, but also a hardware cost saving, which is related to the scanning sequence the in-loop filter 100 uses for processing various coding tree blocks of a picture, as described below. A line buffer is used by the SAO filter 120 to store the pixel data fetched from the memory 180 until the pixel data is no longer needed. Therefore, the reduction in the pixel data fetched from the memory 180 also translates to a smaller line buffer size that is required to temporarily store the pixel data.

In some embodiments, the SAO filter 120 may store the pixel data of the L-shaped region 1011 as received from the deblocking filter 110 to the memory 180 via the bus 125, so that the pixel data of the L-shaped region 1011 may be retrieved again by the SAO filter 120 for processing future blocks. That is, in addition to receiving the pixel data of the L-shaped region 1011 from the deblocking filter 110 and performing the SAO filtering operation using the pixel data of the L-shaped region 1011, the SAO filter 120 may further store the pixel data of the L-shaped region 1011 to the memory 180. In some alternative embodiments, however, the SAO filter 120 may update the pixel data of the L-shaped region 1011 before storing the pixel data to the memory 180. That is, the pixel data of the L-shaped region 1011 may be updated as a result of the SAO filter 120 performing the SAO filtering operation of the current block, and then be stored to the memory 180 for future use.

Figure 11:
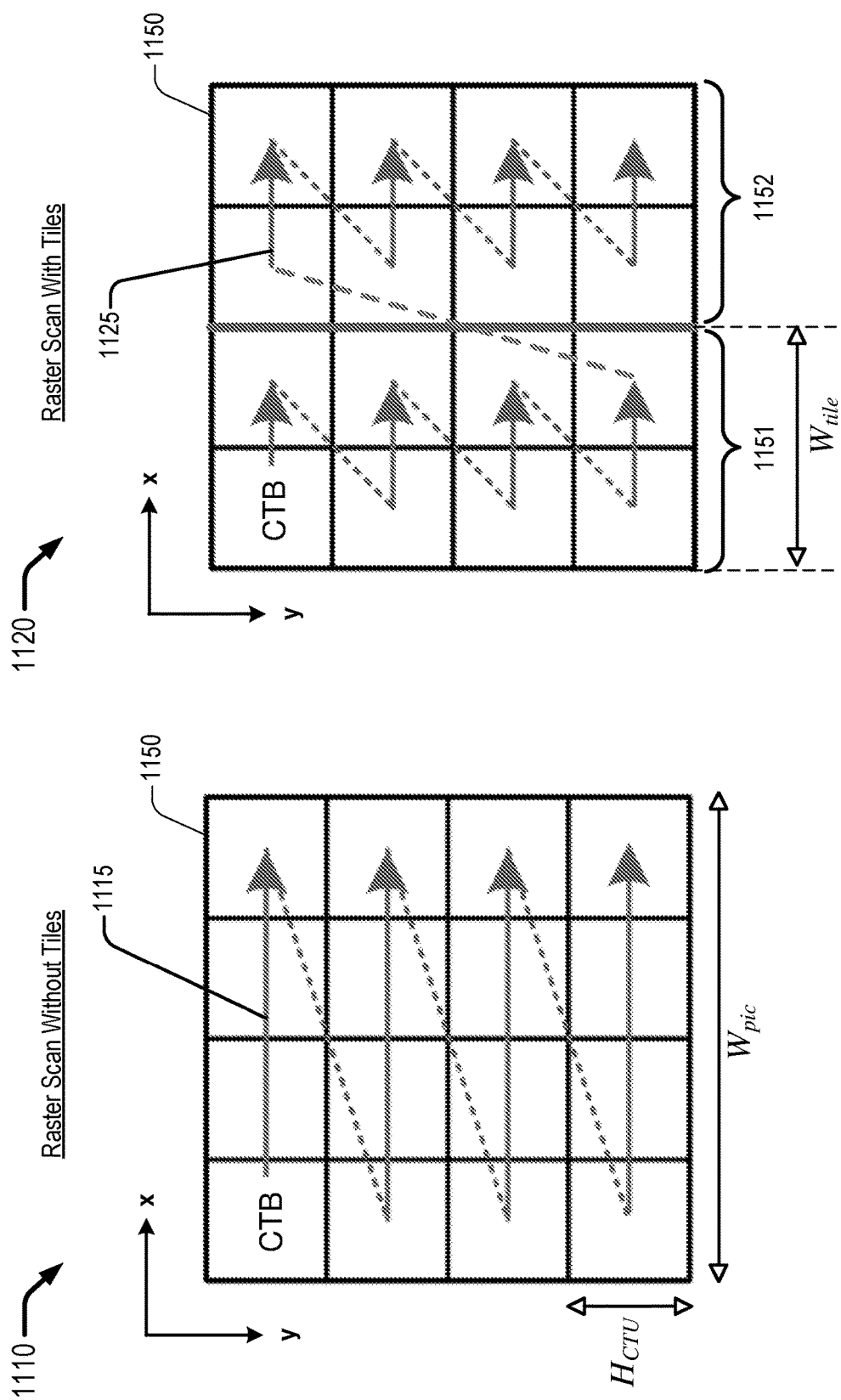
FIG. 11 is a diagram of an example design in accordance with an implementation of the present disclosure.

FIG. 11 illustrates an example design in accordance with an implementation of the present disclosure, wherein two scanning sequences 1110 and 1120 are illustrated. A picture 1150 is a reconstructed picture generated by the inter/intra prediction module 103 using block-based intra-picture and/or inter-picture prediction techniques, and the picture 1150 is currently processed by the in-loop filter 100. The picture 1150 may be a luma picture containing luminance information, or a chroma picture containing chromatic information. As shown in FIG. 11, the picture 1150 is divided into sixteen coding tree blocks (CTBs), with four CTBs in each row (i.e., a CTU row). Each of the CTBs may be further divided into a plurality of blocks that are sequentially processed by the block-based filtering process performed by the in-loop filter 100, such as the blocks 163, 164, 167 and 168.

In some embodiments, the in-loop filter 100 may employ the scanning sequence 1110 and process the CTBs of the picture 1150 following a raster scan pattern 1115. Namely, the in-loop filter 100 may process along the positive x-direction for each CTB of a CTU row before changing to processing the next CTU row, also along the positive x-direction, until every CTB of the picture 1150 is processed. For each pixel location along the x-direction of the picture 1150, the pixel data fetched from the memory 180 by the SAO filter 120 are stored in the line buffer until the SAO filter 120 finishes processing the current CTU row and starts with the next CTU row. Since the employment of the data scheme 900 or 1000 reduces the amount of pixel data the SAO filter 120 is required to fetch from the memory 180, as described elsewhere herein above, a reduction in the size of the line buffer is resulted. Specifically, for each pixel location along the x-direction of the picture 1150, the data scheme 900 or 1000 enables the line buffer to be reduced by a number of pixels, represented by a parameter $N_{saved}$, that is equal to the width of the horizontal segment of the L-shaped region 911 or 1011, i.e., $W_L$ as shown in Eq. (1). Namely, for each pixel location along the x-direction of the picture 1150, $N_{saved} = W_L \min (N_{f2}, N_{ref} - N_{rev})$. Considering the whole picture 1150, the total reduction in the line buffer size benefited from employing the data scheme 900 or 1000, with the raster scan pattern 1115, is $$\text{Line Buffer Size Saving} = N_{saved} \times W_{pic} \times B, \qquad (2)$$

wherein $W_{pic}$ is the width of the picture 1150, measured in pixels, and B is the number of bits used to represent each pixel.

In some embodiments, the in-loop filter 100 may employ the scanning sequence 1120 and process the CTBs of the picture 1150 following a raster scan pattern 1125. In the scanning sequence 1120, the CTBs of the picture 1150 are separated into several tiles, such as tiles 1151 and 1152. The in-loop filter 100 may process along the positive x-direction for each CTB of a CTU row within a tile before changing to processing the next CTU row in the tile, also along the positive x-direction, until every CTB of the picture 1150 is processed. After each CTB in the tile 1151 is processed following the raster scan pattern 1125, the in-loop filter 100 may move from the tile 1151 to the tile 1152 to continue processing CTBs therein, also following the raster scan pattern 1125. Accordingly, the total reduction in the line buffer size benefited from employing the data scheme 900 or 1000, with the raster scan pattern 1125, is $$\text{Line Buffer Size Saving} = N_{saved} \times W_{tile} \times B, \qquad (3)$$

wherein $W_{tile}$ is the width of the tile 1151 and 1152, measured in pixels, and B is the number of bits used to represent each pixel. In an event that the tiles of the picture 1150 do not have a same width, $W_{tile}$ in Eq. (3) is determined by the maximum width of all the tiles of the picture 1150.

For example, if the width of the tile 1151 is larger than that of the tile 1152, then the width of the tile 1151 is used as $W_{tile}$ in Eq. (3).

In addition to a size saving in the line buffer, the data schemes 900 and 1000 may benefit the SAO filter 120 with a size saving in a CTU height buffer. The CTU height buffer provides similar functions as the line buffer, except that the CTU height buffer is used to store the pixel data fetched from the memory 180 by the SAO filter 120 for each pixel location of each CTU row of the picture 1150 along the y-direction. Therefore, the size saving in the CTU height buffer for the raster scan pattern 1115, is $$\text{CTU Height Buffer Size Saving} = N_{saved} \times H_{CTU} \times B, \quad (4)$$

wherein $H_{CTU}$ is the height of each CTB of the picture 1150, measured in pixels, and B is the number of bits used to represent each pixel. For the raster scan pattern 1125, wherein vertical tiles are present, a size saving in a vertical tile buffer is also resulted from the data schemes 900 and 1000. The vertical tile buffer is used to store the right-most rows of a current vertical tile for processing a vertical tile that is located immediately to the right of the current vertical tile. Therefore, the size saving in the vertical tile buffer for the raster scan 1125 is $$\text{Vertical Tile Buffer Size Saving} = N_{saved} \times H_{tile} \times B, \quad (5)$$

wherein $H_{tile}$ is the maximum height of the vertical tiles of the picture 1150, measured in pixels, and may be as high as the height of the picture 1150.

Figure 12:
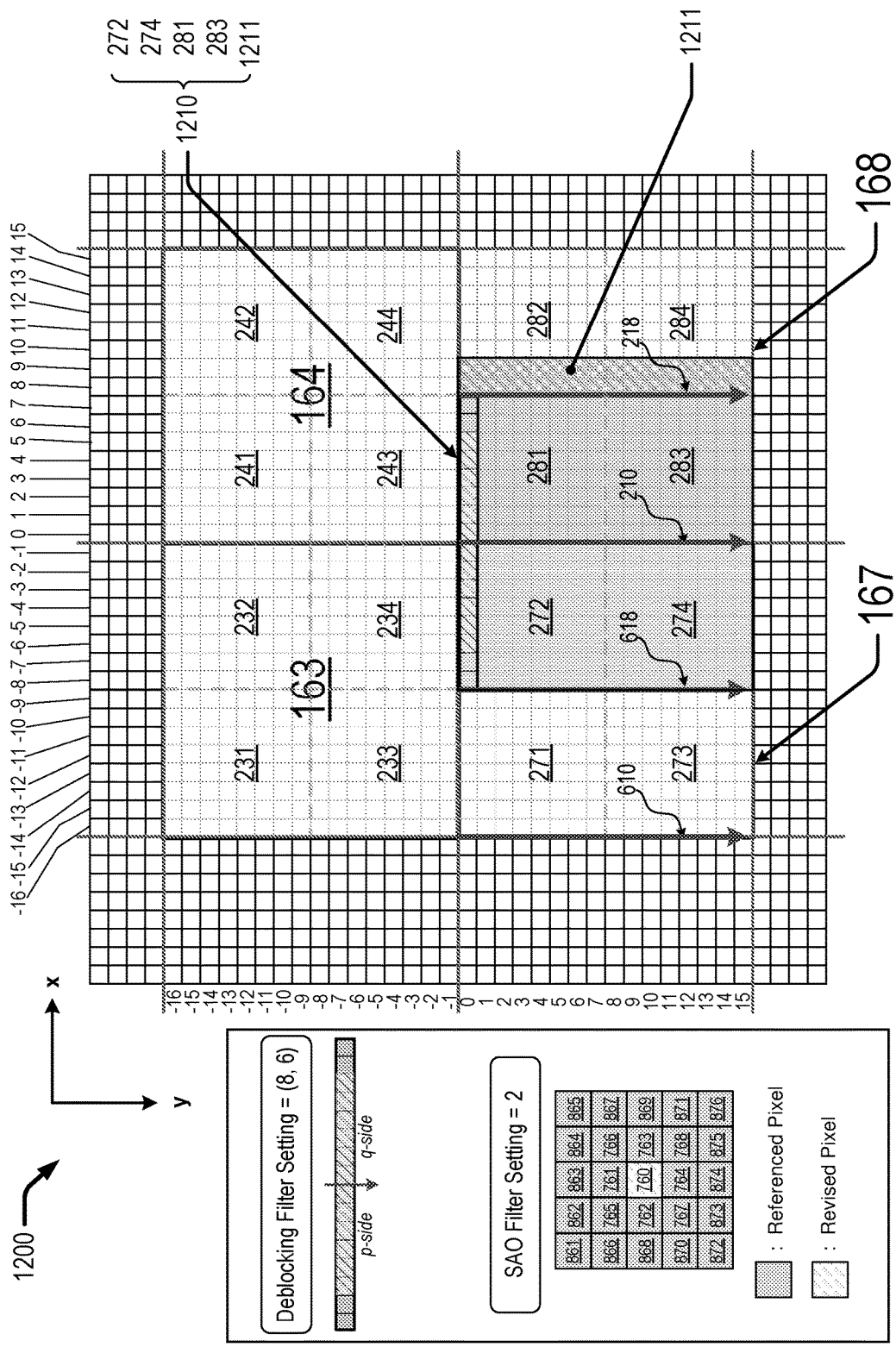
FIG. 12 is a diagram of an example design in accordance with an implementation of the present disclosure.

The idea presented in the data schemes 900 and 1000 regarding the deblocking filter 110 sending more pixel data than the block 710 to the SAO filter 120 is also applicable in an event that the deblocking filter 110 only performs one of the horizontal and vertical filtering operations. For example, the deblocking filtering scheme 600 may be modified such that the deblocking filter 110 outputs to the SAO filter 120 an output block that includes also portions of some partially filtered blocks. FIG. 12 illustrates an example design in accordance with an implementation of the present disclosure, wherein a data scheme 1200 is presented for the combination of the deblocking filter 110 and the SAO filter 120. In the data scheme 1200, the deblocking filter 110 employs a filter setting of (8, 6), and the SAO filter 120 employs a filter setting of 2 pixels. The deblocking filter 110 has performed the horizontal filtering using the deblocking filtering scheme 600 with the filter setting of (8, 6), thereby generating the completely filtered sub-blocks 272, 274, 281 and 283, as well as the partially filtered sub-blocks 282 and 284. According to the data scheme 1200, after the deblocking filter 110 finishes processing the block 168, the deblocking filter 110 may output to the SAO filter 120 an output block 1210 that includes not only the completely filtered sub-blocks 272, 274, 281 and 283, but also a rectangular area 1211. Similar to the data schemes 900 and 1000, the inclusion of the rectangular area 1211 into the output block 1210, which serves as the next current block of the SAO filter 120, is helpful in reducing the amount of pixel data that the SAO filter 120 is required to fetch from the memory 180, thereby reducing the latency introduced in the SAO filter 120 as well as saving the size of the line buffer and/or the CTU height buffer needed for the SAO filter 120.

As shown in FIG. 12, the rectangular area 1211 contains a respective portion (i.e., {(8, 0), (9, 7)} and {(8, 8), (9, 15)}, respectively) of the partially filtered sub-blocks 282 and 284, wherein the respective portion is adjacent to one of the completely filtered sub-blocks (i.e., the sub-blocks 281 and 283, respectively). Also, similar to the width of the L-shaped region 911 or 1011, the width of the rectangular area 1211 is determined by Eq. (1).

In some embodiments, the SAO filter 120 may store the pixel data of the rectangular region 1211 as received from the deblocking filter 110 to the memory 180 via the bus 125, so that the pixel data of the rectangular region 1211 may be retrieved again by the SAO filter 120 for processing future blocks. That is, in addition to receiving the pixel data of the rectangular region 1211 from the deblocking filter 110 and performing the SAO filtering operation using the pixel data of the rectangular region 1211, the SAO filter 120 may further store the pixel data of the rectangular region 1211 to the memory 180. In some alternative embodiments, however, the SAO filter 120 may update the pixel data of the rectangular region 1211 before storing the pixel data to the memory 180. That is, the pixel data of the rectangular region 1211 may be updated as a result of the SAO filter 120 performing the SAO filtering operation of the current block, and then be stored to the memory 180 for future use.

Although the data scheme 1200 is used with the deblocking filter 110 performing only horizontal filtering, a data scheme wherein the deblocking filter 110 performing only vertical filtering operations may be readily derived from the data scheme 1200 by swapping rows and columns in FIG. 12.

In some embodiments, the SAO filter 120 may be replaced by a constrained directional enhancement filter (CDEF), which is able to perform a de-ringing operation similar to what the SAO filter 120 is capable of. Every feature described above regarding to the SAO filter 120 may be directly applied to a CDEF.

XI. Illustrative Implementations

Figure 13:
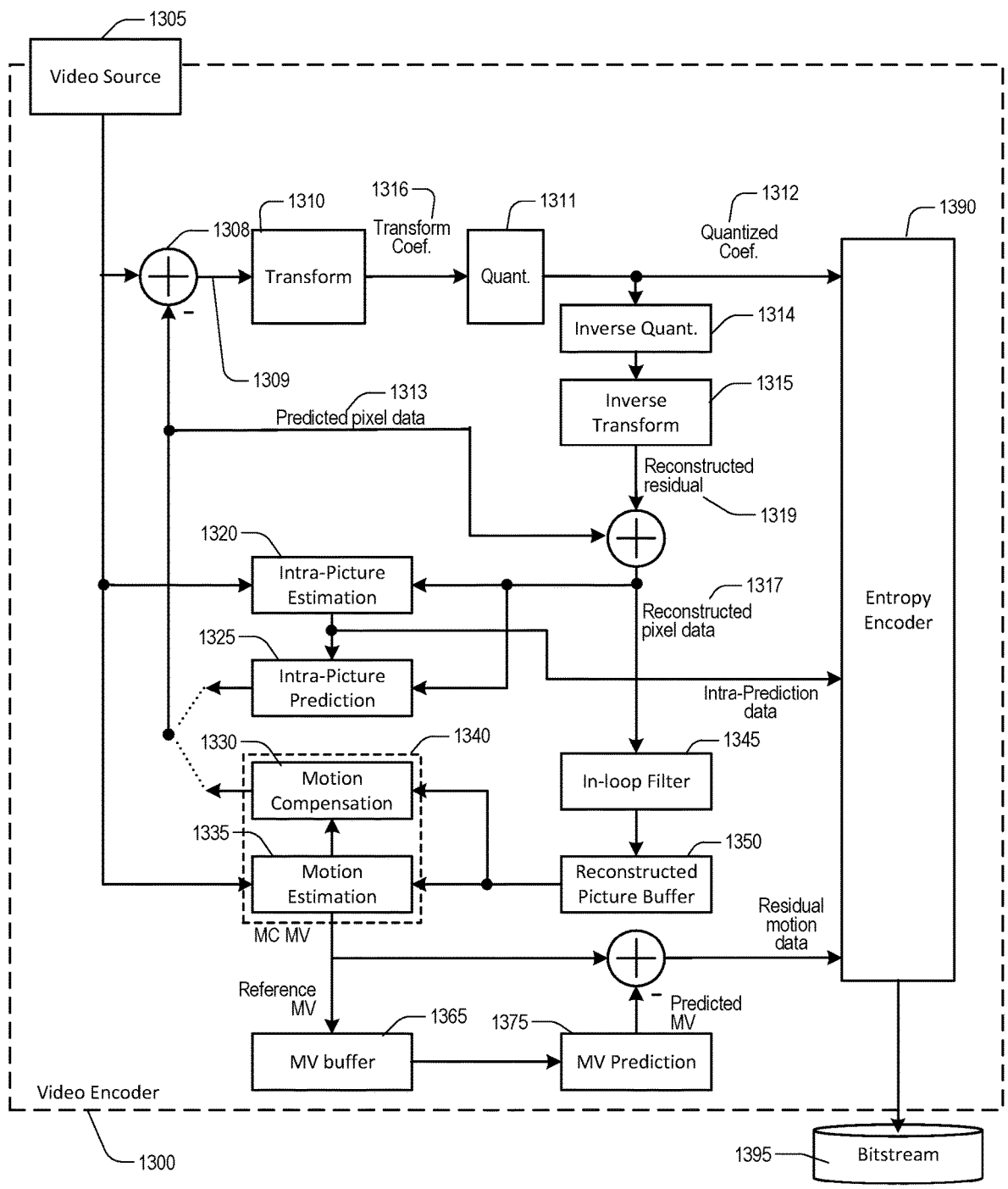
FIG. 13 is a diagram of an example video encoder in accordance with an implementation of the present disclosure.

FIG. 13 illustrates an example video encoder 1300, wherein the various embodiments, filtering schemes and data schemes described elsewhere herein above may be adopted. As illustrated, the video encoder 1300 receives input video signal from a video source 1305 and encodes the signal into bitstream 1395. The video encoder 1300 has several components or modules for encoding the signal from the video source 1305, at least including some components selected from a transform module 1310, a quantization module 1311, an inverse quantization module 1314, an inverse transform module 1315, an intra-picture estimation module 1320, an intra-prediction module 1325, a motion compensation module 1330, a motion estimation module 1335, an in-loop filter 1345, a reconstructed picture buffer 1350, a motion vector (MV) buffer 1365, a MV prediction module 1375, and an entropy encoder 1390. The motion compensation module 1330 and the motion estimation module 1335 are part of an inter-prediction module 1340. The inter-prediction module 1340 may include an integer motion estimation (IME) kernel which is configured to perform integer pixel search, as well as a fractional motion estimation (FME) kernel which is configured to perform fractional pixel search. Both the integer pixel search and the fractional pixel search are essential functions for the motion compensation module 1330 and the motion estimation module 1335.

In some embodiments, the modules 1310-1390 as listed above are modules of software instructions being executed by one or more processing units (e.g., a processor) of a computing device or electronic apparatus. In some embodiments, the modules 1310-1390 are modules of hardware circuits implemented by one or more integrated circuits (ICs) of an electronic apparatus. Though the modules 1310-

1390 are illustrated as being separate modules, some of the modules can be combined into a single module.

The video source 1305 provides a raw video signal that presents pixel data of each video frame without compression. That is, the video source 1305 provides a video stream comprising camera pictures presented in a temporal sequence. A subtractor 1308 computes the difference between the video data from the video source 1305 and the predicted pixel data 1313 from the motion compensation module 1330 or intra-prediction module 1325. The transform module 1310 converts the difference (or the residual pixel data or residual signal) 1309 into transform coefficients 1316 (e.g., by performing Discrete Cosine Transform, or DCT). The quantization module 1311 quantizes the transform coefficients 1316 into quantized data (or quantized coefficients) 1312, which is encoded into the bitstream 1395 by the entropy encoder 1390.

The inverse quantization module 1314 de-quantizes the quantized data (or quantized coefficients) 1312 to obtain transform coefficients, and the inverse transform module 1315 performs inverse transform on the transform coefficients to produce reconstructed residual 1319. The reconstructed residual 1319 is added with the predicted pixel data 1313 to produce reconstructed pixel data 1317. In some embodiments, the reconstructed pixel data 1317 is temporarily stored in a line buffer (not illustrated) for intra-picture prediction and spatial MV prediction. The reconstructed pixels are filtered by the in-loop filter 1345 and stored in the reconstructed picture buffer 1350. In some embodiments, the reconstructed picture buffer 1350 is a storage external to the video encoder 1300. In some embodiments, the reconstructed picture buffer 1350 is a storage internal to the video encoder 1300.

The intra-picture estimation module 1320 performs intra-prediction based on the reconstructed pixel data 1317 to produce intra prediction data. The intra-prediction data is provided to the entropy encoder 1390 to be encoded into bitstream 1395. The intra-prediction data is also used by the intra-prediction module 1325 to produce the predicted pixel data 1313.

The motion estimation module 1335 performs inter-prediction by producing MVs to reference pixel data of previously decoded frames stored in the reconstructed picture buffer 1350. These MVs are provided to the motion compensation module 1330 to produce predicted pixel data.

Instead of encoding the complete actual MVs in the bitstream, the video encoder 1300 uses MV prediction to generate predicted MVs, and the difference between the MVs used for motion compensation and the predicted MVs is encoded as residual motion data and stored in the bitstream 1395.

The MV prediction module 1375 generates the predicted MVs based on reference MVs that were generated for encoding previously video frames, i.e., the motion compensation MVs that were used to perform motion compensation. The MV prediction module 1375 retrieves reference MVs from previous video frames from the MV buffer 1365. The video encoder 1300 stores the MVs generated for the current video frame in the MV buffer 1365 as reference MVs for generating predicted MVs.

The MV prediction module 1375 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 1395 by the entropy encoder 1390.

The entropy encoder 1390 encodes various parameters and data into the bitstream 1395 by using entropy-coding techniques such as context-adaptive binary arithmetic coding (CABAC) or Huffman encoding. The entropy encoder 1390 encodes various header elements, flags, along with the quantized transform coefficients 1312, and the residual motion data as syntax elements into the bitstream 1395. The bitstream 1395 is in turn stored in a storage device or transmitted to a decoder over a communications medium such as a network.

The in-loop filter 1345 performs filtering or smoothing operations on the reconstructed pixel data 1317 to reduce the artifacts of coding, particularly at boundaries of pixel blocks. The in-loop filter 1345 may be embodied by the in-loop filter 100. In some embodiments, the filtering operation performed includes sample adaptive offset (SAO), which may be embodied by the SAO filter 120. In some embodiment, the filtering operations include adaptive loop filter (ALF), which may be embodied by the ALF 130.

Figure 14:
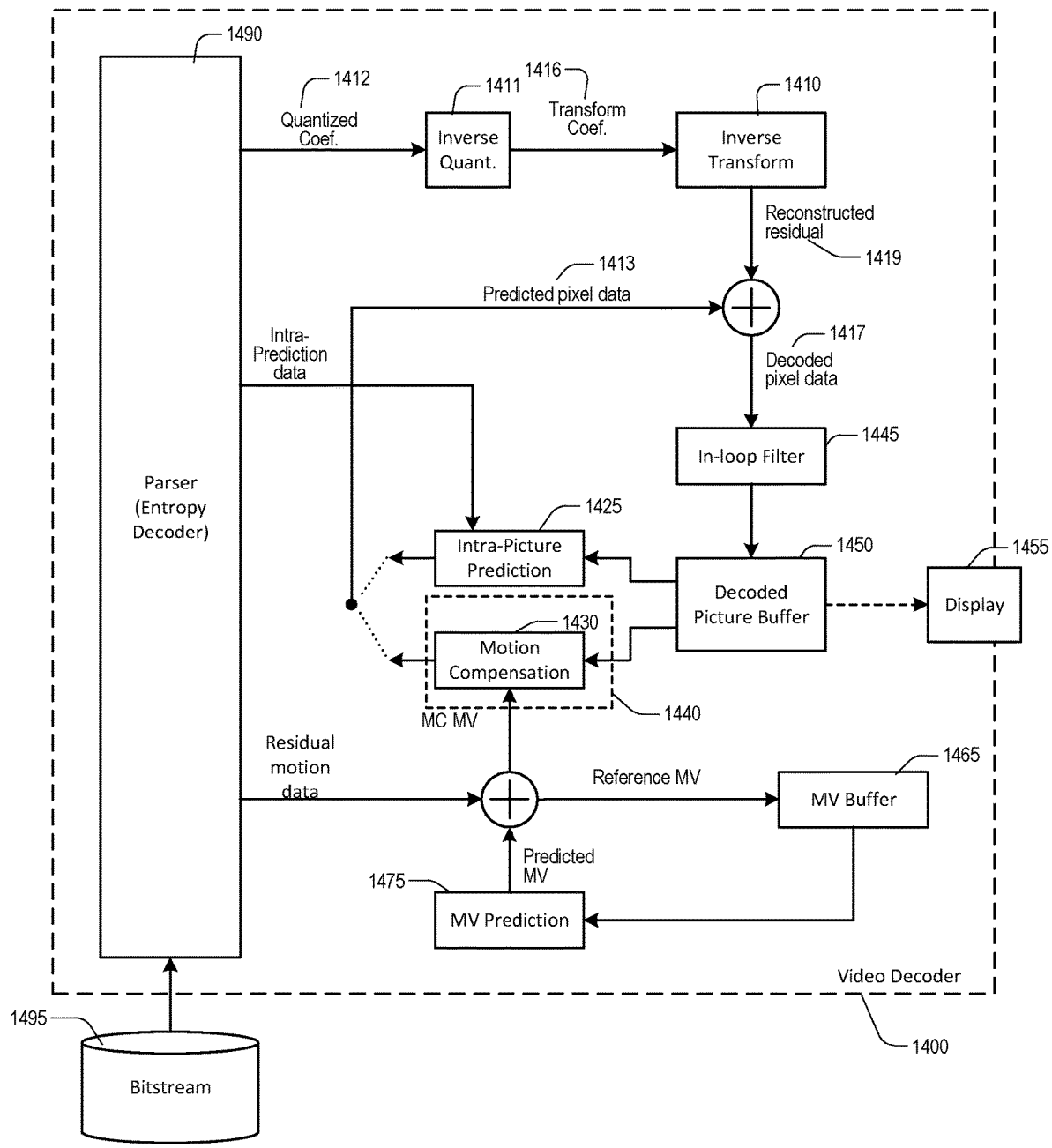
FIG. 14 is a diagram of an example video decoder in accordance with an implementation of the present disclosure.

FIG. 14 illustrates an example video decoder 1400. As illustrated, the video decoder 1400 is an image-decoding or video-decoding circuit that receives a bitstream 1495 and decodes the content of the bitstream 1495 into pixel data of video frames for display. The video decoder 1400 has several components or modules for decoding the bitstream 1495, including some components selected from an inverse quantization module 1411, an inverse transform module 1410, an intra-prediction module 1425, a motion compensation module 1430, an in-loop filter 1445, a decoded picture buffer 1450, a MV buffer 1465, a MV prediction module 1475, and a parser 1490. The motion compensation module 1430 is part of an inter-prediction module 1440.

In some embodiments, the modules 1410-1490 are modules of software instructions being executed by one or more processing units (e.g., a processor) of a computing device. In some embodiments, the modules 1410-1490 are modules of hardware circuits implemented by one or more integrated circuits (ICs) of an electronic apparatus. Though the modules 1410-1490 are illustrated as being separate modules, some of the modules can be combined into a single module.

The parser (e.g., an entropy decoder) 1490 receives the bitstream 1495 and performs initial parsing according to the syntax defined by a video-coding or image-coding standard. The parsed syntax element includes various header elements, flags, as well as quantized data (or quantized coefficients) 1412. The parser 1490 parses out the various syntax elements by using entropy-coding techniques such as context-adaptive binary arithmetic coding (CABAC) or Huffman coding.

The inverse quantization module 1411 de-quantizes the quantized data (or quantized coefficients) 1412 to obtain transform coefficients 1416, and the inverse transform module 1410 performs inverse transform on the transform coefficients 1416 to produce reconstructed residual signal 1419. The reconstructed residual signal 1419 is added with predicted pixel data 1413 from the intra-prediction module 1425 or the motion compensation module 1430 to produce decoded pixel data 1417. The decoded pixels data 1417 are filtered by the in-loop filter 1445 and stored in the decoded picture buffer 1450. In some embodiments, the decoded picture buffer 1450 is a storage external to the video decoder 1400. In some embodiments, the decoded picture buffer 1450 is a storage internal to the video decoder 1400.

The intra-prediction module 1425 receives intra-prediction data from bitstream 1495 and according to which, produces the predicted pixel data 1413 from the decoded pixel data 1417 stored in the decoded picture buffer 1450. In some embodiments, the decoded pixel data 1417 is also stored in a line buffer (not illustrated) for intra-picture prediction and spatial MV prediction.

In some embodiments, the content of the decoded picture buffer 1450 is used for display. A display device 1455 either retrieves the content of the decoded picture buffer 1450 for display directly or retrieves the content of the decoded picture buffer to a display buffer. In some embodiments, the display device receives pixel values from the decoded picture buffer 1450 through a pixel transport.

The motion compensation module 1430 produces predicted pixel data 1413 from the decoded pixel data 1417 stored in the decoded picture buffer 1450 according to motion compensation MVs (MC MVs). These motion compensation MVs are decoded by adding the residual motion data received from the bitstream 1495 with predicted MVs received from the MV prediction module 1475.

The MV prediction module 1475 generates the predicted MVs based on reference MVs that were generated for decoding previous video frames, e.g., the motion compensation MVs that were used to perform motion compensation. The MV prediction module 1475 retrieves the reference MVs of previous video frames from the MV buffer 1465. The video decoder 1400 stores the motion compensation MVs generated for decoding the current video frame in the MV buffer 1465 as reference MVs for producing predicted MVs.

The in-loop filter 1445 performs filtering or smoothing operations on the decoded pixel data 1417 to reduce the artifacts of coding, particularly at boundaries of pixel blocks. The in-loop filter 1445 may be embodied by the in-loop filter 100. In some embodiments, the filtering operation performed includes sample adaptive offset (SAO), which may be embodied by the SAO filter 120. In some embodiment, the filtering operations include adaptive loop filter (ALF), which may be embodied by the ALF 130.

Figure 15:
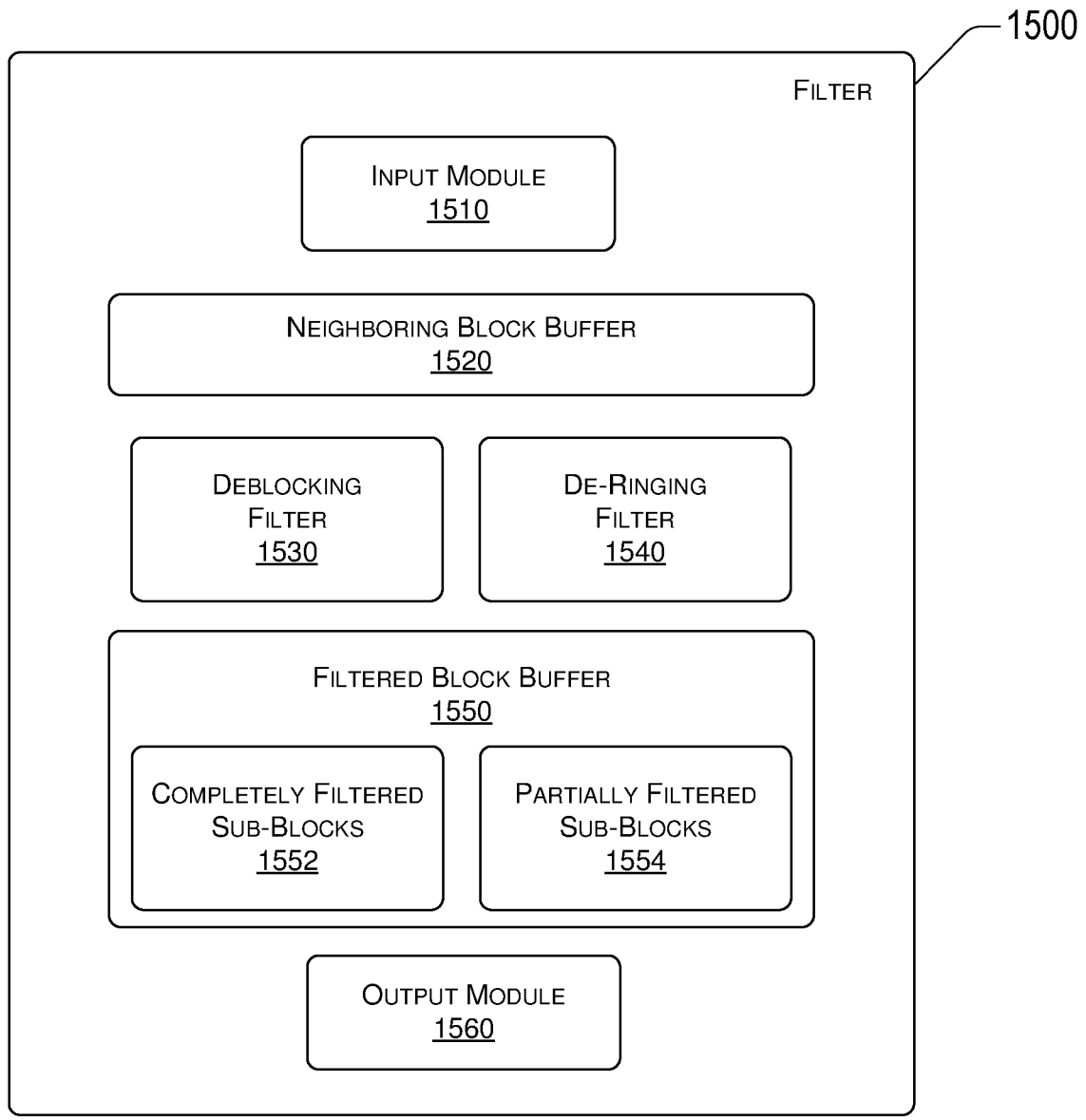
FIG. 15 is a diagram of an example in-loop filter in accordance with an implementation of the present disclosure.

FIG. 15 illustrates a filter 1500 that may embody the in-loop filter 1345 of the video encoder 1300, or the in-loop filter 1445 of the video decoder 1400. The filter 1500 may also embody the in-loop filter 100 or the deblocking filter 110. The filter 1500 may process a picture using a block-based pipeline process. The filter 1500 has several components or modules, including some components selected from an input module 1510, a neighboring block buffer 1520, a deblocking filter 1530, a de-ringing filter 1540, a filtered block buffer 1550, and an output module 1560.

The input module 1510 may be configured to receive a current block of a picture of a video, whereas the current block is the block that the filter 1500 currently starts to process. For example, the input module 1510 may be configured to receive the current block 168. The input module 1510 may also receive a first set of pixel data of one or more neighboring blocks of the current block, and subsequently store the first set of pixel data in the neighboring block buffer 1520. For example, the first set of pixel data may include the sub-blocks 243, 244, 272 and 274, which belong to two neighboring blocks (i.e., the blocks 164 and 167) of the block 168.

The neighboring block buffer 1520 may be configured to store the first set of pixel data of one or more neighboring blocks of the current block. The first set of pixel data of one or more neighboring blocks may be stored in the neighboring block buffer 1520 by the input module 1510 after the input module 1510 receives the first set of pixel data. In some embodiments, the neighboring block buffer 1520 may additionally store a second set of pixel data of the one or more neighboring blocks. For example, the neighboring block buffer 1520 may additionally store pixel data of the L-shaped region 938 or 1038. The second set of pixel data may be used by the de-ringing filter 1540 to perform a de-ringing operation to the output block.

The deblocking filter 1530 may be configured to perform a deblocking operation to the current block using pixel data of the current block and the first set of pixel data of the one or more neighboring blocks. For example, the deblocking filter 1530 may embody the deblocking filter 110 and may perform a deblocking operation according to the horizontal filtering scheme 300, the horizontal filtering scheme 400, the vertical filtering scheme 500, or the vertical filtering scheme 580. The deblocking filter 1530 may perform a vertical filtering operation along the deblocking boundary 250 using pixel data of the block 168 as well as pixel data of the sub-blocks 243 and 244. Alternatively or additionally, the deblocking filter 1530 may perform a horizontal filtering operation along the deblocking boundary 210 using pixel data of the block 168 as well as pixel data of the sub-blocks 272 and 274.

As a result of the deblocking operation, the deblocking filter 1530 may generate a filtered block that includes one or more completely filtered sub-blocks and one or more partially filtered sub-blocks. The filtered block buffer 1550 may be configured to store the filtered block. For example, after the deblocking filter 1530 performs the deblocking operation along the deblocking boundaries 210, 218, 250 and 258, the deblocking filter 1530 may generate a filtered block encompassing the completely filtered sub-blocks 243, 272 and 281, as well as the partially filtered sub-blocks 244, 274, 282, 283 and 284. The completely filtered sub-blocks 243, 272 and 281 may be stored in a first part 1552 of the filtered block buffer 1550, whereas the partially filtered sub-blocks 244, 274, 282, 283 and 284 may be stored in a second part 1554 of the filtered block buffer 1550.

The output module 1560 may be configured to output an output block comprising the one or more completely filtered sub-blocks stored in the first part 1552 of the filtered block buffer 1550, as well as a respective portion of each of the one or more partially filtered sub-blocks stored in the second part 1554 of the filtered block buffer 1550. For example, the output module 1560 may be configured to output the output block 910 that includes the completely filtered sub-blocks 234, 243, 272 and 281, as well as the L-shaped region 911. The L-shaped region 911 is adjacent to the completely filtered sub-blocks 243, 272 and 281. As described elsewhere herein above, the L-shaped region 911 consists of respective portions of the partially filtered sub-blocks 244, 282, 284, 283 and 274, wherein each of the respective portions is adjacent to a corresponding one of the completely filtered sub-blocks 234, 243, 272 and 281.

The de-ringing filter 1540 may be configured to perform a de-ringing operation to the output block using pixel data of the output block and the second set of pixel data of the one or more neighboring blocks. For example, the de-ringing filter 1540 may embody the SAO filter 120 and may perform a de-ringing operation using pixel data of the block 930 or the block 1030. The block 930 includes the output block 910 and the L-shaped region 938. The block 1030 includes the output block 1010 and the L-shaped region 1038. Each of the L-shaped regions 938 and 1038 includes pixel data from the blocks 163, 164 and 167, which are neighboring blocks of the current block 168.

In some embodiments, the de-ringing filter 1540 may be external to the filter 1500, and the output module 1560 may output the output block to the de-ringing filter 1540. In some embodiments, the filter 1500 may include the de-ringing filter 1540. The de-ringing filter 1540 may be a SAO filer or a constrained directional enhancement filter (CDEF). The de-ringing filter 1540 may embody the SAO filter 120.

XII. Illustrative Processes

Figure 16:
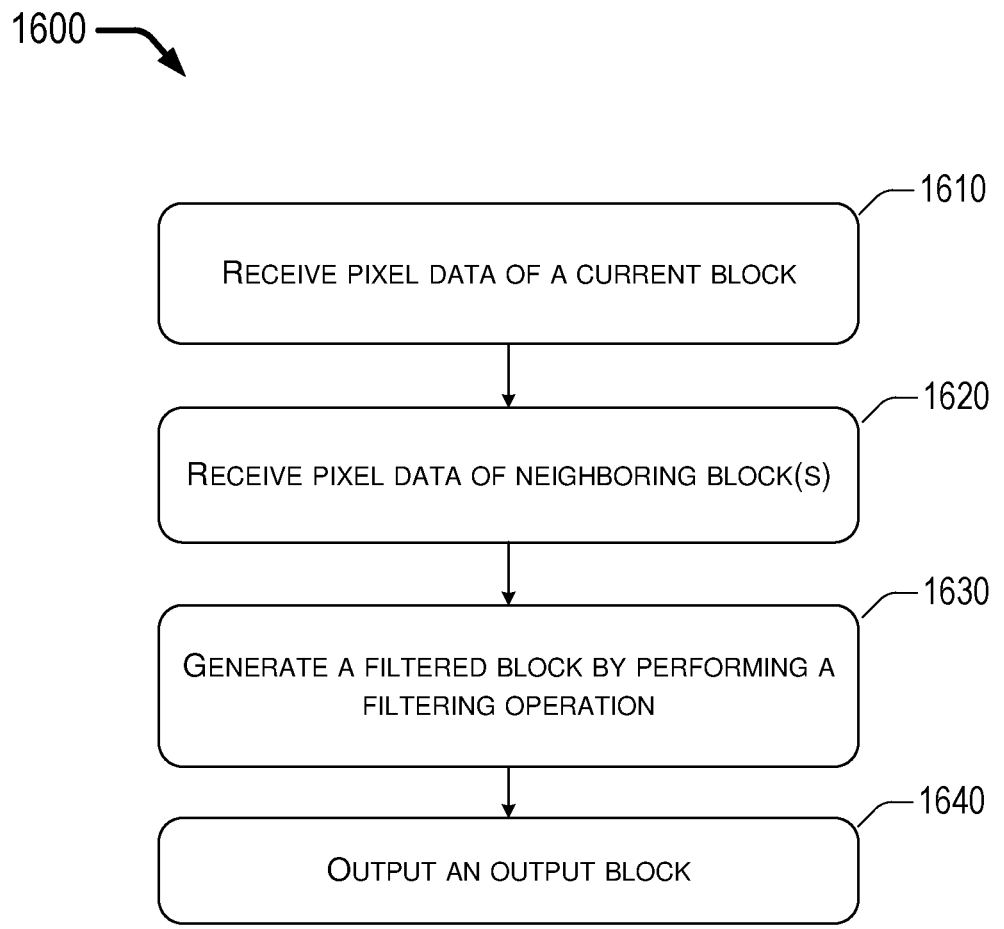
FIG. 16 is a flowchart of an example process in accordance with an implementation of the present disclosure.

FIG. 16 illustrates an example process 1600 in accordance with an implementation of the present disclosure. Process 1600 may represent an aspect of implementing various proposed designs, concepts, schemes, systems and methods described above. More specifically, process 1600 may represent an aspect of the proposed concepts and schemes pertaining to realizing an efficient in-loop filtering process in accordance with the present disclosure. Process 1600 may include one or more operations, actions, or functions as illustrated by one or more of blocks 1610, 1620, 1630 and 1640. Although illustrated as discrete blocks, various blocks of process 1600 may be divided into additional blocks, combined into fewer blocks, or eliminated, depending on the desired implementation. Moreover, the blocks/sub-blocks of process 1600 may be executed in the order shown in FIG. 16 or, alternatively in a different order. Furthermore, one or more of the blocks/sub-blocks of process 1600 may be executed repeatedly or iteratively. Process 1600 may be implemented by or in the apparatus 1500 as well as any variations thereof. Solely for illustrative purposes and without limiting the scope, process 1600 are described below in the context of the apparatus 1500. Process 1600 may begin at block 1610.

At 1610, process 1600 may involve the input module 1510 receiving pixel data of a current block. For example, the input module 1510 may receive pixel data of the block 168 from the inter/intra prediction module 103. Process 1600 may proceed from 1610 to 1620.

At 1620, process 1600 may involve the input module 1510 receiving pixel data of one or more neighboring blocks of the current block. For example, the input module 1510 may receive from the inter/intra prediction module 103 the pixel data of the sub-blocks 243 and 244 and the pixel data of the sub-blocks 272 and 274. The sub-blocks 243 and 244 belong to the block 164, which is a neighboring block immediately above the current block 168. The sub-blocks 272 and 274 belong to the block 167, which is a neighboring block immediately left to the current block 168. Process 1600 may also involve the input module 1510 storing the pixel data of one or more neighboring blocks to the neighboring block buffer 1520. Process 1600 may proceed from 1620 to 1630.

At 1630, process 1600 may involve the deblocking filter 1530 generating a filtered block by performing the filtering operation to the current block. The filtering operation may be performed using the pixel data of the current block and the pixel data of the one or more neighboring blocks. The filtered block may include one or more completely filtered sub-blocks and one or more partially filtered sub-blocks. For example, the deblocking filter 1530 may employ the data scheme 1200 and perform a horizontal filtering operation using the deblocking filter setting of (8, 6) along the deblocking boundaries 210 and 218 of the current block 168. The horizontal filtering operation may be performed using pixel data of the block 168 as well as pixel data of the neighboring block 167, particularly the pixel data of the sub-blocks 272 and 274. The deblocking filter 1530 may accordingly generate a filtered block that includes four completely filtered sub-blocks 272, 274, 281 and 283, as well as two partially filtered sub-blocks 282 and 284. Process 1600 may proceed from 1630 to 1640.

At 1640, process 1600 may involve the output module 1560 outputting an output block that includes the one or more completely filtered sub-blocks and a respective portion of each of the one or more partially filtered sub-blocks, wherein each of the respective portions is adjacent to one of the completely filtered sub-blocks. For example, the output module 1560 may employ the data scheme 1200 and output the output block 1210. The output block 1210 includes the completely filtered sub-blocks 272, 274, 281 and 283, as well as the rectangular region 1211. The rectangular region 1211 includes a portion of the partially filtered sub-block 282 and a portion of the partially filtered sub-block 284. The portion of the partially filtered sub-block 282, i.e., {(8, 0), (9, 7)}, is adjacent to the completely filtered sub-block 281. The portion of the partially filtered sub-block 284, i.e., {(8, 8), (9, 15)}, is adjacent to the completely filtered sub-block 283.

Figure 17:
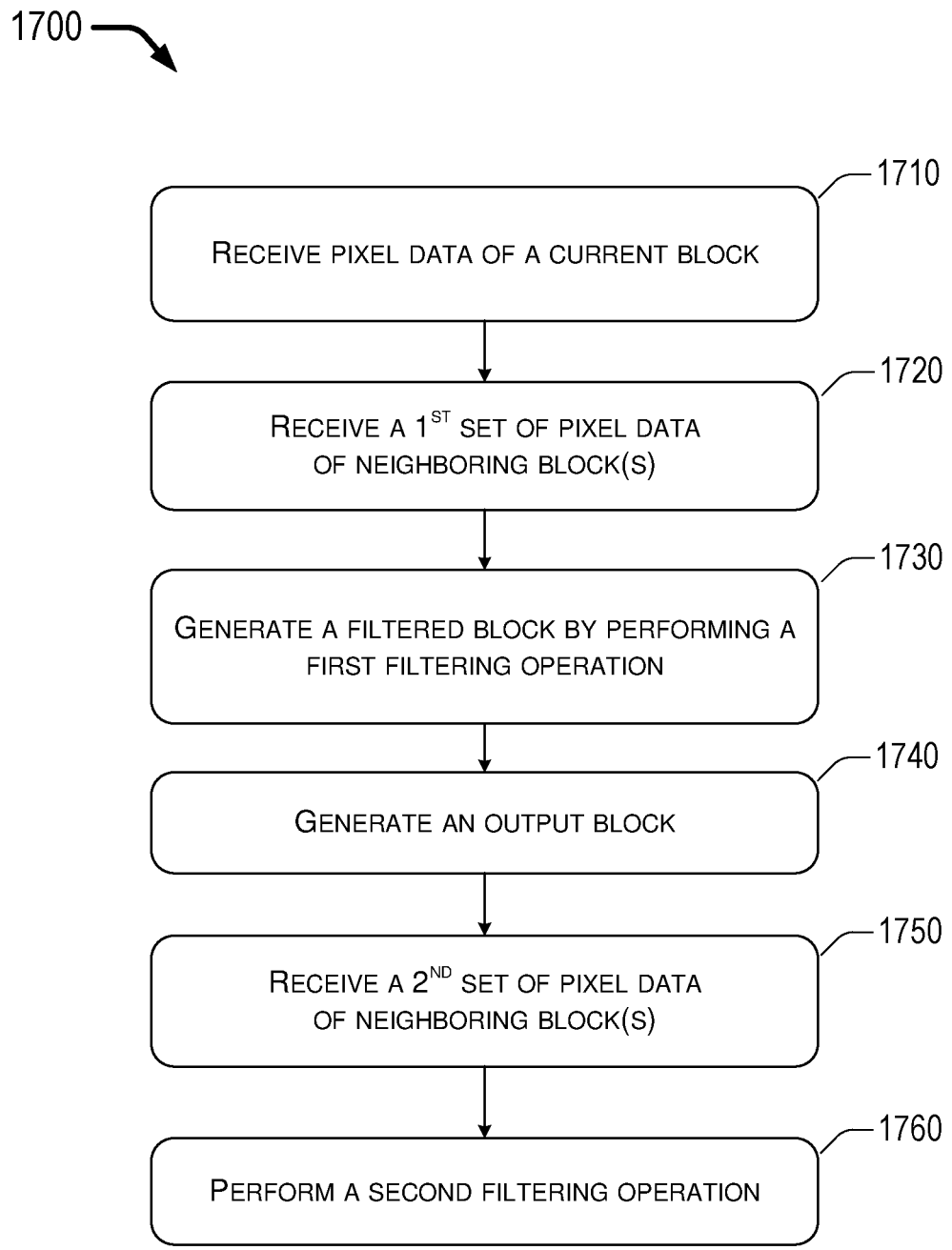
FIG. 17 is a flowchart of an example process in accordance with an implementation of the present disclosure.

FIG. 17 illustrates an example process 1700 in accordance with an implementation of the present disclosure. Process 1700 may represent an aspect of implementing various proposed designs, concepts, schemes, systems and methods described above. More specifically, process 1700 may represent an aspect of the proposed concepts and schemes pertaining to realizing an efficient in-loop filtering process in accordance with the present disclosure. Process 1700 may include one or more operations, actions, or functions as illustrated by one or more of blocks 1710, 1720, 1730, 1740, 1750 and 1760. Although illustrated as discrete blocks, various blocks of process 1700 may be divided into additional blocks, combined into fewer blocks, or eliminated, depending on the desired implementation. Moreover, the blocks/sub-blocks of process 1700 may be executed in the order shown in FIG. 17 or, alternatively in a different order. Furthermore, one or more of the blocks/sub-blocks of process 1700 may be executed repeatedly or iteratively. Process 1700 may be implemented by or in the apparatus 1500 as well as any variations thereof. Solely for illustrative purposes and without limiting the scope, process 1700 are described below in the context of the apparatus 1500. Process 1700 may begin at block 1710.

At 1710, process 1700 may involve the input module 1510 receiving pixel data of a current block. For example, the input module 1510 may receive pixel data of the block 168 from the inter/intra prediction module 103. Process 1700 may proceed from 1710 to 1720.

At 1720, process 1700 may involve the input module 1510 receiving a first set of pixel data of one or more neighboring blocks of the current block. For example, the input module 1510 may receive from the inter/intra prediction module 103 the pixel data of the sub-blocks 243 and 244 and the pixel data of the sub-blocks 272 and 274. The sub-blocks 243 and 244 belong to the block 164, which is a neighboring block immediately above the current block 168. The sub-blocks 272 and 274 belong to the block 167, which is a neighboring block immediately left to the current block 168. Process 1700 may also involve the input module 1510 storing the pixel data of one or more neighboring blocks to the neighboring block buffer 1520. Process 1700 may proceed from 1720 to 1730.

At 1730, process 1700 may involve the deblocking filter 1530 generating a filtered block by performing the filtering operation to the current block. The filtering operation may be performed using the pixel data of the current block and the pixel data of the one or more neighboring blocks. The filtered block may include one or more completely filtered sub-blocks and one or more partially filtered sub-blocks. For example, the deblocking filter 1530 may employ the data scheme 1000 and perform a horizontal filtering operation and a vertical filtering operation both using the deblocking filter setting of (8, 6). The deblocking filter 1530 may perform the horizontal filtering operation along the deblocking boundaries 210 and 218, and the vertical filtering operation along the deblocking boundaries 250 and 258. The horizontal filtering operation may be performed using pixel data of the block 168 as well as pixel data of the neighboring block 167, particularly the pixel data of the sub-blocks 272 and 274. The vertical filtering operation may be performed using pixel data of the block 168 as well as pixel data of the neighboring block 164, particularly the pixel data of the sub-blocks 243 and 244. The deblocking filter 1530 may accordingly generate a filtered block that includes three completely filtered sub-blocks 243, 272 and 281, as well as five partially filtered sub-blocks 244, 282, 284, 283 and 274. Process 1700 may proceed from 1730 to 1740.

At 1740, process 1700 may involve the output module 1560 outputting an output block that includes the one or more completely filtered sub-blocks and a respective portion of each of the one or more partially filtered sub-blocks, wherein each of the respective portions is adjacent to one of the completely filtered sub-blocks. For example, the output module 1560 may employ the data scheme 1000 and output the output block 1010. The output block 1010 includes the completely filtered sub-blocks 234, 243, 272 and 281, as well as the L-shaped region 1011. The L-shaped region 1011 includes a portion of the partially filtered sub-block 244, a portion of the partially filtered sub-block 282, a portion of the partially filtered sub-block 284, a portion of the partially filtered sub-block 283 and a portion of the partially filtered sub-block 274. The portion of the partially filtered sub-block 244, i.e., {(8, −8), (9, −1)}, is edge-adjacent to the completely filtered sub-block 243. The portion of the partially filtered sub-block 282, i.e., {(8, 0), (9, 7)}, is edge-adjacent to the completely filtered sub-block 281. The portion of the partially filtered sub-block 284, i.e., {(8, 8), (9, 9)}, is corner-adjacent to the completely filtered sub-block 281. The portion of the partially filtered sub-block 283, i.e., {(0, 8), (7, 9)}, is edge-adjacent to the completely filtered sub-block 281. The portion of the partially filtered sub-block 274, i.e., {(−8, 8), (−1, 9)}, is edge-adjacent to the completely filtered sub-block 272. Process 1700 may proceed from 1740 to 1750.

At 1750, process 1700 may involve the input module 1510 receiving a second set of pixel data of one or more neighboring blocks of the current block. For example, the de-ringing filter 1540 may employ the data scheme 1000 and receive from the inter/intra prediction module 103 the pixel data in the L-shaped are 1038 as the second set of pixel data. The L-shaped are 1038 includes pixel data from the blocks 163, 164 and 167, which are neighboring blocks to the current block 168. Process 1700 may also involve the input module 1510 storing the second set of pixel data to the neighboring block buffer 1520. Process 1700 may further involve the de-ringing filter 1540 receiving the second set of pixel data from the neighboring block buffer 1520. Process 1700 may proceed from 1750 to 1760.

At 1760, process 1700 may involve the de-ringing filter 1540 performing a second filtering operation for each pixel of the one or more completely filtered sub-blocks using pixel data of the output block, the second set of pixel data, or both. For example, the de-ringing filter 1540 may perform an SAO filtering operation using a SAO filter setting of 2 pixels for each pixel of the block 710. The de-ringing filter 1540 may perform the SAO filtering operation using pixel data within the block 1030, which includes the block 1010 and the L-shaped region 1038. For each pixel of the block 710, the de-ringing filter 1540 may reference two pixels in each of a left direction, a right direction, a top direction, and a bottom direction and accordingly revise the value of the respective pixel. In some embodiments, the de-ringing filter 1540 may further reference two pixels from the respective pixel in each of a top-left direction, a top-right direction, a bottom-left direction, and a bottom-right direction and accordingly revise the value of the respective pixel.

XIII. Illustrative Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 18:
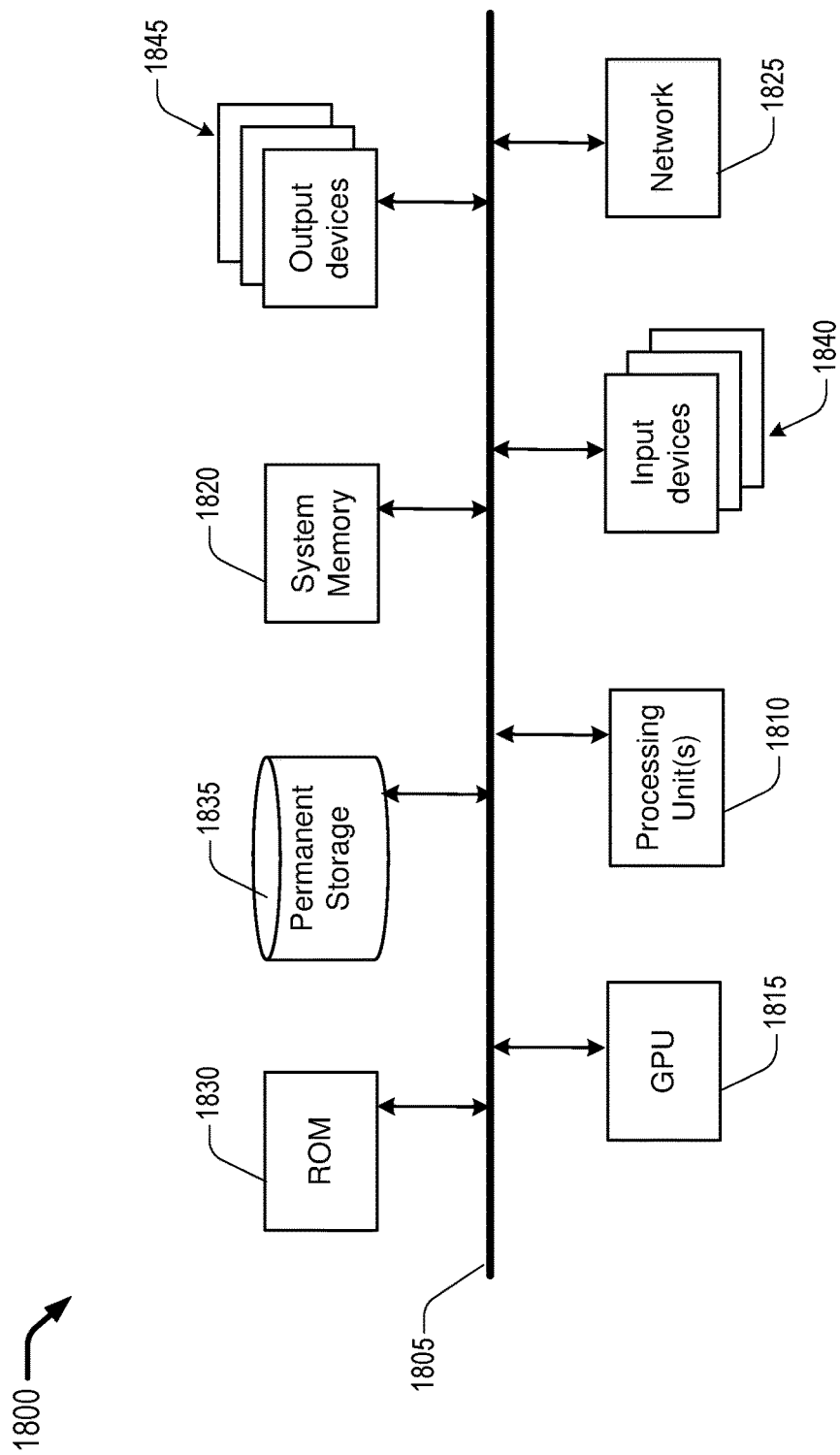
FIG. 18 is a diagram of an example electronic system in accordance with an implementation of the present disclosure.

FIG. 18 conceptually illustrates an electronic system 1800 with which some embodiments of the present disclosure are implemented. The electronic system 1800 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1800 includes a bus 1805, processing unit(s) 1810, a graphics-processing unit (GPU) 1815, a system memory 1820, a network 1825, a read-only memory 1830, a permanent storage device 1835, input devices 1840, and output devices 1845.

The bus 1805 collectively represents all system, peripheral, and chipset buses that communicatively connect the numerous internal devices of the electronic system 1800. For instance, the bus 1805 communicatively connects the processing unit(s) 1810 with the GPU 1815, the read-only memory 1830, the system memory 1820, and the permanent storage device 1835.

From these various memory units, the processing unit(s) 1810 retrieves instructions to execute and data to process in order to execute the processes of the present disclosure. The processing unit(s) may be a single processor or a multi-core processor in different embodiments. Some instructions are passed to and executed by the GPU 1815. The GPU 1815 can offload various computations or complement the image processing provided by the processing unit(s) 1810.

The read-only-memory (ROM) 1830 stores static data and instructions that are used by the processing unit(s) 1810 and other modules of the electronic system. The permanent storage device 1835, on the other hand, is a read-and-write memory device. This device is a non-volatile memory unit that stores instructions and data even when the electronic system 1800 is off. Some embodiments of the present disclosure use a mass-storage device (such as a magnetic or optical disk and its corresponding disk drive) as the permanent storage device 1835.

Other embodiments use a removable storage device (such as a floppy disk, flash memory device, etc., and its corresponding disk drive) as the permanent storage device. Like the permanent storage device 1835, the system memory 1820 is a read-and-write memory device. However, unlike storage device 1835, the system memory 1820 is a volatile read-and-write memory, such a random access memory. The system memory 1820 stores some of the instructions and data that the processor uses at runtime. In some embodiments, processes in accordance with the present disclosure are stored in the system memory 1820, the permanent storage device 1835, and/or the read-only memory 1830. For example, the various memory units include instructions for processing multimedia clips in accordance with some embodiments. From these various memory units, the processing unit(s) 1810 retrieves instructions to execute and data to process in order to execute the processes of some embodiments.

The bus 1805 also connects to the input and output devices 1840 and 1845. The input devices 1840 enable the user to communicate information and select commands to the electronic system. The input devices 1840 include alphanumeric keyboards and pointing devices (also called "cursor control devices"), cameras (e.g., webcams), microphones or similar devices for receiving voice commands, etc. The output devices 1845 display images generated by the electronic system or otherwise output data. The output devices 1845 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 18, bus 1805 also couples electronic system 1800 to a network 1825 through a network adapter (not shown). In this manner, the computer can be a part of a network of computers (such as a local area network ("LAN"), a wide area network ("WAN"), or an Intranet, or a network of networks, such as the Internet. Any or all components of electronic system 1800 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method of processing a current block of a picture, comprising:
   receiving pixel data of the current block;
   receiving pixel data of one or more neighboring blocks of the current block;
   generating a filtered block by performing a filtering operation to the current block using the pixel data of the current block and the pixel data of the one or more neighboring blocks, the filtered block comprising one or more completely filtered sub-blocks and one or more partially filtered sub-blocks; and
   outputting an output block, the output block comprising the one or more completely filtered sub-blocks and a respective portion of each of the one or more partially filtered sub-blocks, the respective portion being adjacent to one of the completely filtered sub-blocks,
   wherein the filtering operation comprises a deblocking operation, the picture comprises a reconstructed picture using block-based intra-picture or inter-picture prediction, and the performing of the filtering operation comprises either or both of:
      performing a horizontal filtering operation along at least one vertical deblocking boundary of the block, and
      performing a vertical filtering operation along at least one horizontal deblocking boundary of the block,
   the horizontal filtering operation comprises, on each of two sides of the at least one vertical deblocking boundary, referencing a first number of pixels and revising a second number of pixels, and
   the vertical filtering operation comprises, on each of two sides of the at least one horizontal deblocking boundary, referencing a third number of pixels and revising a fourth number of pixels.

2. The method of claim 1, wherein:
   the one or more neighboring blocks comprise a first neighboring block immediately above the current block and a second neighboring block immediately left to the current block,
   the one or more partially filtered sub-blocks comprise three partially filtered sub-blocks that overlap with the current block and two partially filtered sub-blocks that respectively overlap with the first and second neighboring blocks, and
   the respective portions of the partially filtered sub-blocks collectively form an L-shaped area.

3. The method of claim 1, wherein:
   the one or more neighboring blocks comprise a neighboring block immediately left to the current block,
   the one or more partially filtered sub-blocks comprise a partially filtered sub-block that overlaps with the current block, and
   the respective portion of the partially filtered sub-block comprises a rectangular area.

4. The method of claim 1, wherein:
   the performing of the filtering operation comprises performing the horizontal filtering operation,
   the respective portion comprises a rectangular area having a horizontal dimension of a fifth number of pixels, and
   the fifth number is equal to a difference between the first number and the second number.

5. The method of claim 1, wherein:
   the performing of the filtering operation comprises performing the vertical filtering operation,
   the respective portion comprises a rectangular area having a vertical dimension of a sixth number of pixels, and the sixth number is equal to a difference between the third number and the fourth number.

6. The method of claim 1, wherein:
the performing of the filtering operation comprises performing both the horizontal filtering operation and the vertical filtering operation; and
the respective portions of the partially filtered sub-blocks collectively form an L-shaped area comprising a first segment having a width of a fifth number of pixels and a second segment having a width of a sixth number of pixels,
the fifth number is equal to a difference between the first number and the second number, and
the sixth number is equal to a difference between the third number and the fourth number.

7. The method of claim 1, wherein the pixel data of the one or more neighboring blocks comprises a first set of pixel data, and wherein the filtering operation comprises a first filtering operation, the method further comprising:
receiving a second set of pixel data of the one or more neighboring blocks,
performing a second filtering operation for each pixel of the one or more completely filtered sub-blocks using pixel data of the output block, the second set of pixel data, or both, wherein the second filtering operation comprises:
referencing a seventh number of pixels adjacent to the respective pixel of the one or more completely filtered sub-blocks in each of a left direction, a right direction, a top direction, and a bottom direction; and
revising the respective pixel of the one or more completely filtered sub-blocks based on the referencing.

8. The method of claim 7, wherein:
the respective portions of the partially filtered sub-blocks collectively form an L-shaped area comprising a first segment having a width of a fifth number of pixels and a second segment having a width of a sixth number of pixels,
the second filtering operation further comprises referencing the seventh number of pixels adjacent to the respective pixel of the one or more completely filtered sub-blocks in each of a top-left direction, a top-right direction, a bottom-left direction, and a bottom-right direction, and
the seventh number is equal to the fifth number and the sixth number.

9. The method of claim 7, wherein:
the deblocking operation is performed by a first filter,
the second filtering operation comprises a de-ringing operation performed by a second filter,
the second filter comprises a sample adaptive offset (SAO) filter or a constrained directional enhancement filter (CDEF), and
the first and second filters are configured to process the picture using a block-based pipeline process.

10. An apparatus, comprising:
an input module configured to receive a current block of a picture;
a neighboring block buffer configured to store a first set of pixel data of one or more neighboring blocks of the current block;
a deblocking filter configured to perform a deblocking operation to the current block using pixel data of the current block and the first set of pixel data of the one or more neighboring blocks;
a filtered block buffer configured to store one or more completely filtered sub-blocks and one or more partially filtered sub-blocks; and
an output module configured to output an output block comprising the one or more completely filtered sub-blocks and a respective portion of each of the one or more partially filtered sub-blocks, the respective portion being adjacent to one of the completely filtered sub-blocks, wherein the deblocking filter is configured to perform the deblocking operation along at least one vertical or horizontal deblocking boundary of the current block by referencing a first number of pixels and revising a second number of pixels on each of two sides of the at least one vertical or horizontal deblocking boundary, and wherein:
the respective portion comprises a rectangular area having a width or length of a third number of pixels, and
the third number is equal to a difference between the first number and the second number.

11. The apparatus of claim 10, wherein:
the one or more neighboring blocks comprise a first neighboring block immediately above the current block and a second neighboring block immediately left to the current block,
the deblocking operation comprises a horizontal filtering operation and a vertical filtering operation,
the one or more partially filtered sub-blocks comprise three partially filtered sub-blocks that overlap with the current block and two partially filtered sub-blocks that respectively overlap with the first and second neighboring blocks, and
the respective portions of the partially filtered sub-blocks collectively form an L-shaped area.

12. The apparatus of claim 10, wherein:
the one or more neighboring blocks comprise a neighboring block immediately left to the current block,
the deblocking operation comprises a horizontal filtering operation,
the one or more partially filtered sub-blocks comprise a partially filtered sub-block that overlaps with the current block, and
a respective portion of a partially filtered sub-block comprises a rectangular area.

13. The apparatus of claim 10, wherein:
the respective portions of the partially filtered sub-blocks collectively form an L-shaped area comprising a first segment and a second segment each having a width of the third number of pixels.

14. The apparatus of claim 10, wherein:
the neighboring block buffer is further configured to store a second set of pixel data of the one or more neighboring blocks,
the apparatus further comprising:
a de-ringing filter configured to perform a de-ringing operation for each pixel of the one or more completely filtered sub-blocks using pixel data of the output block and the second set of pixel data of the one or more neighboring blocks.

15. The apparatus of claim 14, wherein the de-ringing filter is configured to perform the de-ringing operation by referencing a seventh number of pixels adjacent to each pixel of the one or more completely filtered sub-blocks in each of a left direction, a right direction, a top direction, and a bottom direction and revising the respective pixel of the one or more completely filtered sub-blocks based on the referencing.

16. The apparatus of claim 15, wherein the de-ringing filter is configured to perform the de-ringing operation by further referencing the seventh number of pixels adjacent to the respective pixel of the one or more completely filtered sub-blocks in each of a top-left direction, a top-right direction, a bottom-left direction, and a bottom-right direction.

17. The apparatus of claim 14, wherein:
the de-ringing filter comprises a sample adaptive offset (SAO) filter or a constrained directional enhancement filter (CDEF), and
the deblocking filter and the de-ringing filter are configured to process the picture using a block-based pipeline process.

\* \* \* \* \*